(12) United States Patent
Sturgeon et al.

(10) Patent No.: US 12,600,373 B2
(45) Date of Patent: Apr. 14, 2026

(54) POSITIONING APPLICATION FOR ADAS CALIBRATION TARGET

(71) Applicant: Atieva, Inc., Newark, CA (US)

(72) Inventors: Bobby James Marvin Sturgeon, Pittsburg, CA (US); Nikhil Arvind Bagul, San Jose, CA (US)

(73) Assignee: Atieva, Inc., Newark, CA (US)

( * ) Notice: Subject to any disclaimer, the term of this patent is extended or adjusted under 35 U.S.C. 154(b) by 228 days.

(21) Appl. No.: 18/328,511

(22) Filed: Jun. 2, 2023

(65) Prior Publication Data

US 2024/0343262 A1    Oct. 17, 2024

Related U.S. Application Data

(60) Provisional application No. 63/495,872, filed on Apr. 13, 2023.

(51) Int. Cl.
B60W 50/14        (2020.01)
G01S 17/894        (2020.01)
(Continued)

(52) U.S. Cl.
CPC ........... B60W 50/14 (2013.01); G01S 17/894 (2020.01); G06T 5/50 (2013.01); G06T 7/20 (2013.01);
(Continued)

(58) Field of Classification Search
None
See application file for complete search history.

(56) References Cited

U.S. PATENT DOCUMENTS 11,993,282 B2 *  5/2024  Rogers ............... G01B 11/2755
2022/0375281 A1 * 11/2022  Huang ................. G07C 5/0816
2022/0381909 A1 * 12/2022  Park ..................... G06N 3/0475

FOREIGN PATENT DOCUMENTS

EP        3686552 A1    7/2020
EP        3771922 A1 *  2/2021    ........... G01S 7/4026
WO    2020079698 A1    4/2020

OTHER PUBLICATIONS

International Search Report and Written Opinion for PCT Application No. PCT/US2024/024009, mailed on Jul. 23, 2024, 12 pages.

* cited by examiner

*Primary Examiner* — James J Lee
*Assistant Examiner* — David Hatch
(74) *Attorney, Agent, or Firm* — Brake Hughes Bellermann LLP

(57) ABSTRACT

A method of calibrating an advanced driver assistance system (ADAS) for a vehicle comprises: receiving first information by a mobile device that has a camera and a light detection and ranging (LiDAR) device, the first information comprising a three-dimensional (3D) specification of physical dimensions for the vehicle having the ADAS; scanning, by the mobile device, the vehicle and a physical target for the ADAS, the scanning performed with the camera and the LiDAR device after receiving the first information, the scanning generating frame data; tracking, by the mobile device, the vehicle in the frame data using the first information; generating, by the mobile device, an output indicating whether the physical target is positioned at a target location for the ADAS; and initiating, after the output is generated, a calibration process of the ADAS that uses the physical target.

19 Claims, 18 Drawing Sheets

(51) Int. Cl.
     *G06T 5/50*          (2006.01)
     *G06T 7/20*          (2017.01)
     *G06T 17/00*         (2006.01)

(52) U.S. Cl.
     CPC .... *G06T 17/00* (2013.01); *G06T 2207/20221*
                               (2013.01)

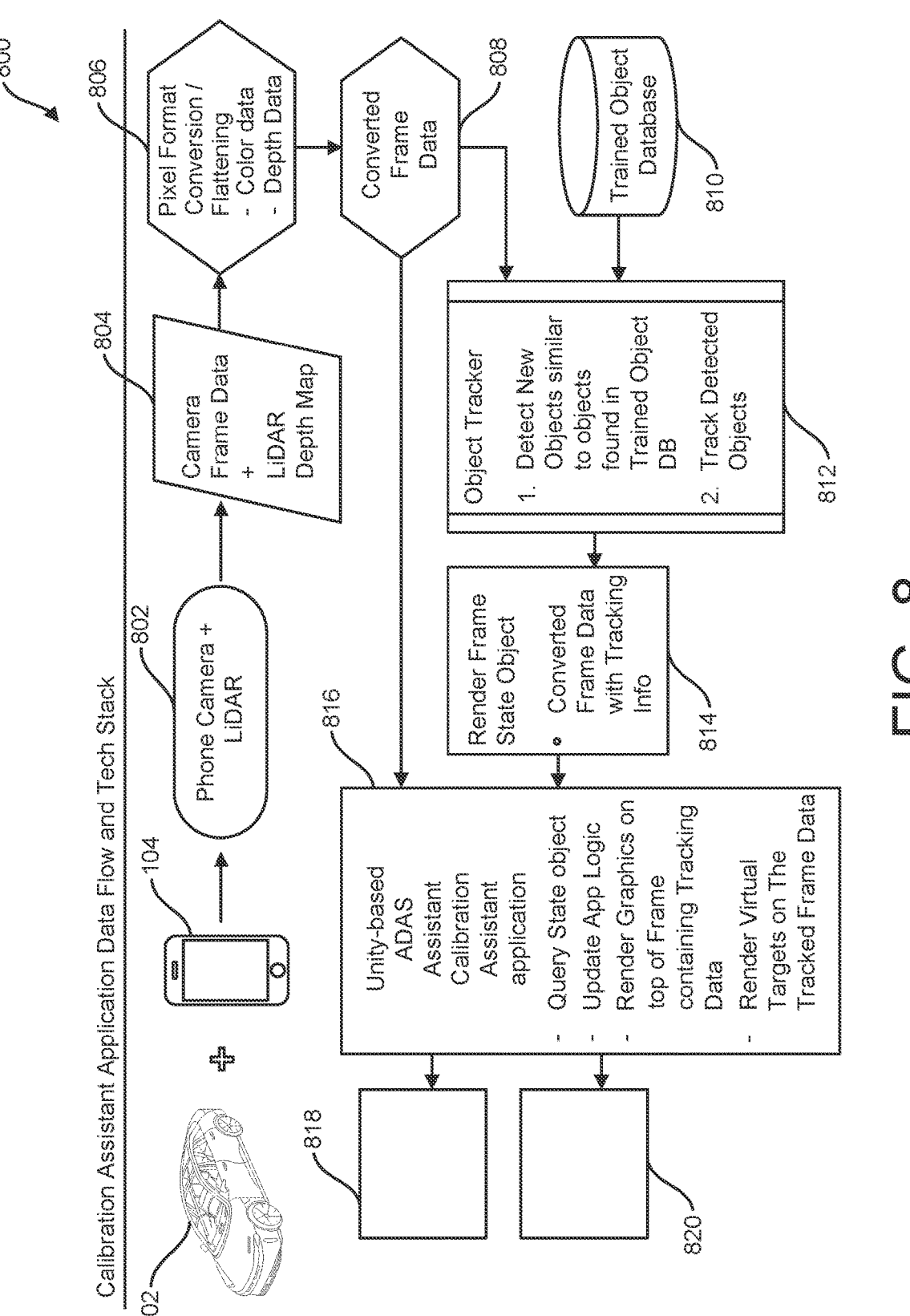

Calibration Assistant Application Data Flow and Tech Stack

800

806

Pixel Format Conversion / Flattening
- Color data
- Depth Data

808

Converted Frame Data

Trained Object Database

810

804

Camera Frame Data + LiDAR Depth Map

Object Tracker
1. Detect New Objects similar to objects found in Trained Object DB
2. Track Detected Objects

812

802

Phone Camera + LiDAR

Render Frame State Object
• Converted Frame Data with Tracking Info

814

816

104

Unity-based ADAS Assistant Calibration Assistant application
- Query State object
- Update App Logic
- Render Graphics on top of Frame containing Tracking Data
- Render Virtual Targets on The Tracked Frame Data

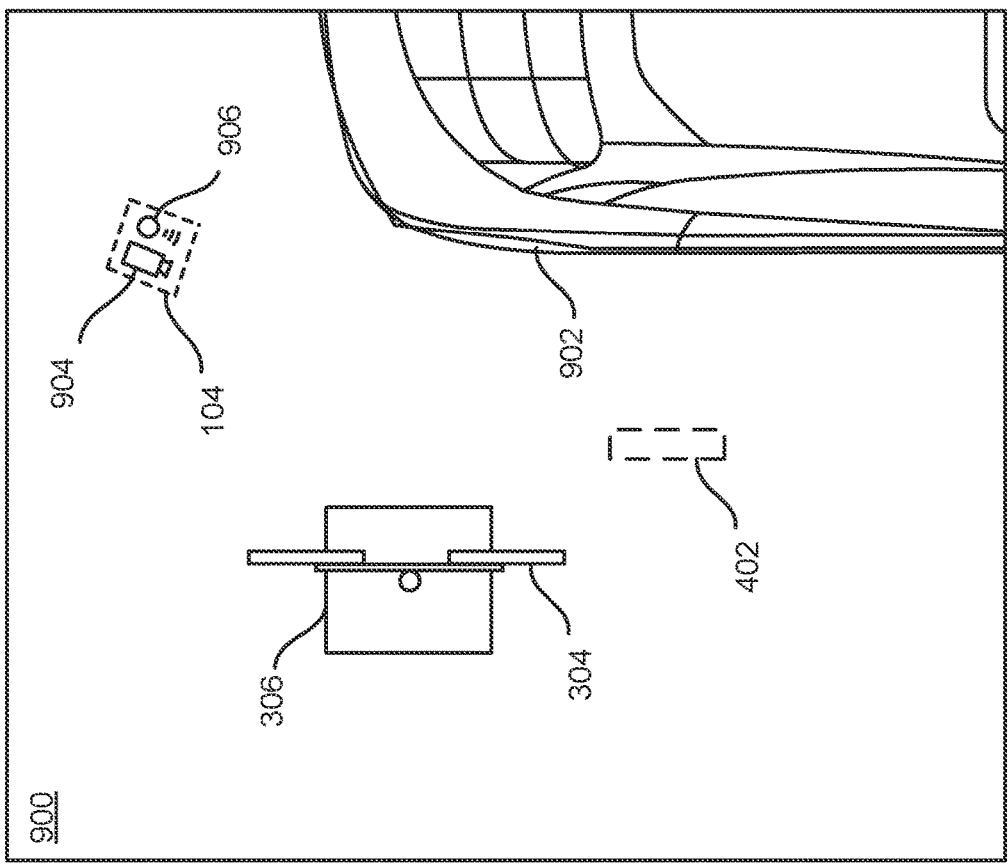
FIG. 9A
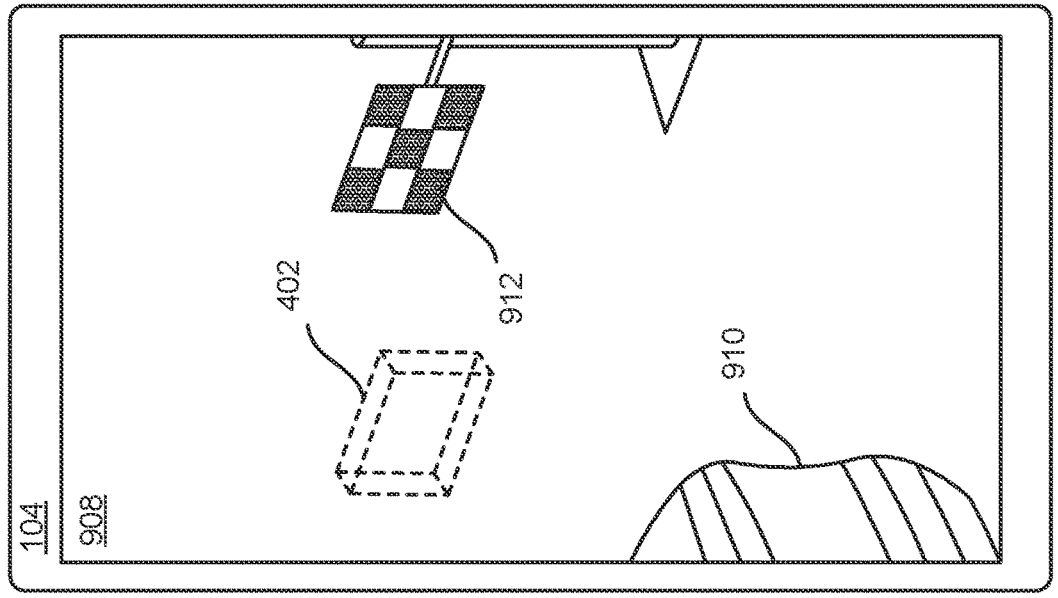

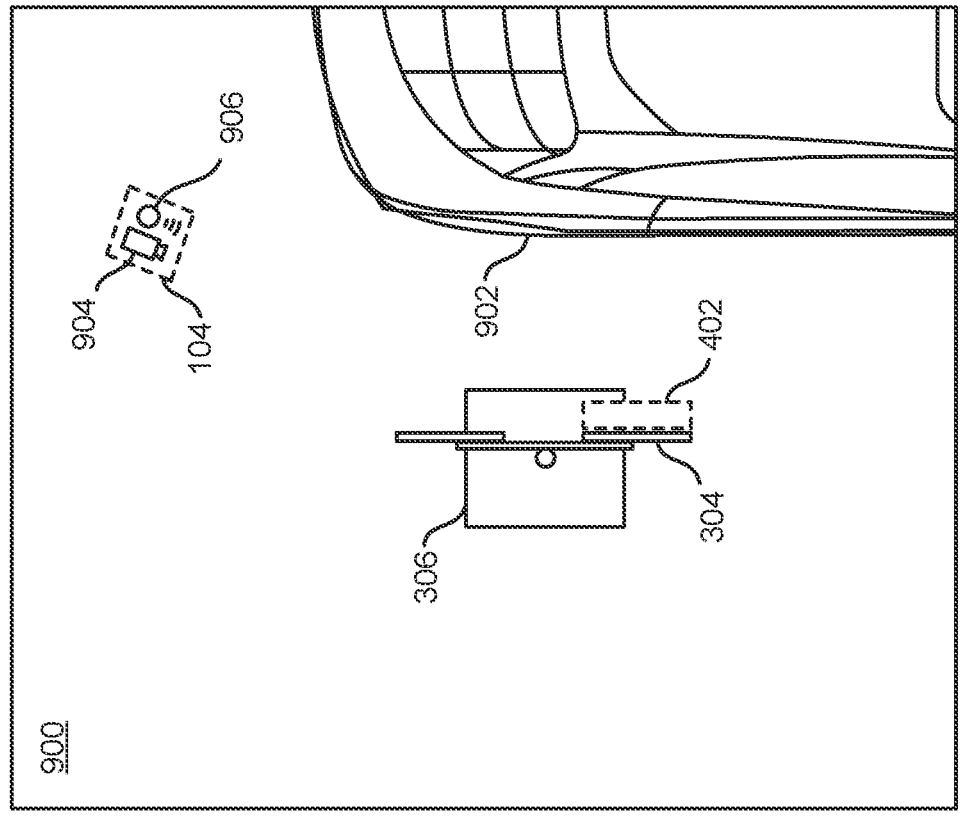
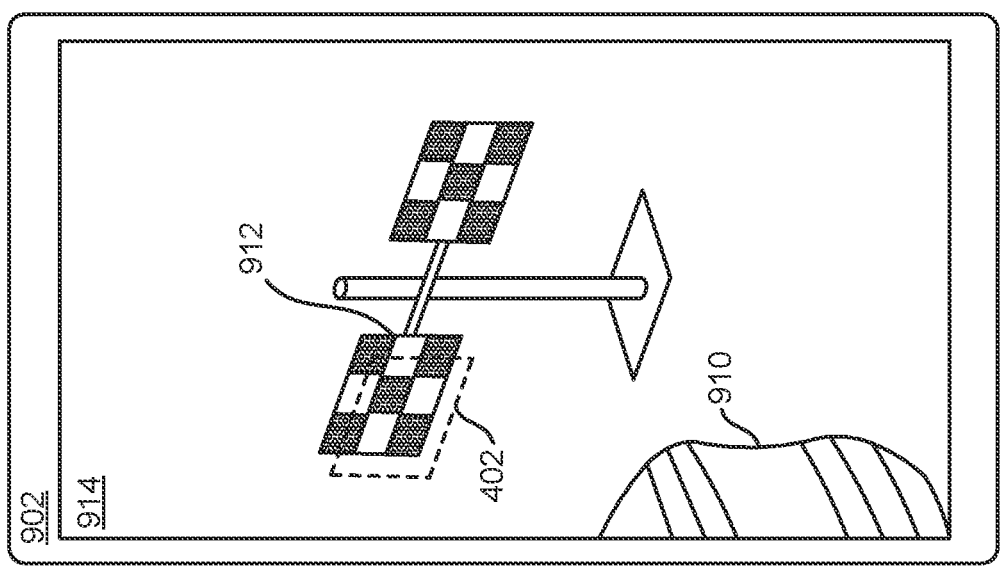
FIG. 9B

POSITIONING APPLICATION FOR ADAS CALIBRATION TARGET

CROSS-REFERENCE TO RELATED APPLICATION

This application claims benefit, under 35 U.S.C. § 119, of U.S. Provisional Patent Application No. 63/495,872, filed on Apr. 13, 2023, entitled "POSITIONING APPLICATION FOR ADAS CALIBRATION TARGET", the disclosure of which is incorporated by reference herein in its entirety.

TECHNICAL FIELD

This document relates to a positioning application for an advanced driver assistance system (ADAS) calibration target.

BACKGROUND

Some vehicles manufactured nowadays are equipped with an ADAS that can at least in part handle operations relating to the driving of the vehicle. ADASs can automatically survey surroundings of the vehicle and take action regarding detected vehicles, pedestrians, or objects. Calibration is performed to configure the ADAS. However, existing calibration systems are expensive, cumbersome, inefficient, imprecise, and/or take up considerable floor space in service centers. One previous approach places a target for the ADAS calibration on a stand that is to be positioned relative to the vehicle. The positioning is done by placing another target on a wheel of the vehicle, capturing an image of this other target using a camera on the stand, and relocating the stand until the target for the ADAS calibration.

SUMMARY

In a first aspect, a method of calibrating an advanced driver assistance system (ADAS) for a vehicle comprises: receiving first information by a mobile device that has a camera and a light detection and ranging (LiDAR) device, the first information comprising a three-dimensional (3D) specification of physical dimensions for the vehicle having the ADAS; scanning, by the mobile device, the vehicle and a physical target for the ADAS, the scanning performed with the camera and the LiDAR device after receiving the first information, the scanning generating frame data; tracking, by the mobile device, the vehicle in the frame data using the first information; generating, by the mobile device, an output indicating whether the physical target is positioned at a target location for the ADAS; and initiating, after the output is generated, a calibration process of the ADAS that uses the physical target.

Implementations can include any or all of the following features. Generating the output comprises presenting a camera feed on a display of the mobile device, and adding a virtual target in the camera feed, the virtual target positioned according to a calibration specification for the ADAS. Multiple virtual targets are specified by the calibration specification, the method further comprising selecting the virtual target from among the multiple virtual targets for adding the virtual target to the camera feed. The method further comprises rendering a virtual overlay on the vehicle in the camera feed, the virtual overlay positioned based on tracking the vehicle in the frame data. The method further comprises receiving, by the mobile device, second information comprising a 3D specification for the physical target; and tracking, by the mobile device, also the physical target in the frame data, the physical target tracked using the second information, wherein the output indicates whether the physical target is positioned at the target location for the ADAS based on the tracking of the physical target. The method further comprises performing a determination, by the mobile device and based on the tracking of the physical target, that a position of the physical target substantially coincides with the target location for the ADAS, wherein the output is generated based on the determination. The mobile device is a handheld device or a wearable device. The method is a one-person process performed on the mobile device, and wherein a person carries the mobile device and observes, on the display, (i) the camera feed including the physical target and (ii) the virtual target while maneuvering the physical target. The first information includes a computer aided design model of the vehicle.

In a second aspect, a method of examining a vehicle comprises: receiving first and second information by a mobile device that has a camera and a light detection and ranging (LiDAR) device, the first information comprising a three-dimensional (3D) specification of physical dimensions for the vehicle, the second information comprising a 3D specification for a physical component of the vehicle; scanning the vehicle by the mobile device, the scanning performed with the camera and the LiDAR device after receiving the first and second information, the scanning generating frame data; tracking, by the mobile device, the vehicle and the physical component in the frame data using the first and second information; and generating, by the mobile device, a presentation using the frame data, the presentation including a camera feed of at least part of the vehicle, and a 3D representation of the physical component overlaid on the camera feed, the 3D representation positioned based on the tracking.

Implementations can include any or all of the following features. The method further comprises rendering a virtual overlay on the vehicle in the camera feed, the virtual overlay positioned based on tracking the vehicle in the frame data. Both the vehicle and the virtual overlay are visible in the presentation. The virtual overlay includes a periphery for the part of the vehicle of the camera feed, further comprising performing verification of alignment between the virtual overlay and the vehicle in the camera feed. The mobile device is a handheld or wearable device. The method is a one-person process performed on the mobile device, and wherein a person carries the mobile device and observes, on a display of the mobile device, (i) the camera feed including the physical component, and (ii) the 3D representation of the physical component. The first information includes a computer aided design model of the vehicle.

BRIEF DESCRIPTION OF DRAWINGS

FIG. 8 shows an example of a data flow and tech stack for facilitating ADAS calibration using a calibration assistant.

FIGS. 9A-9B show examples of positioning an ADAS calibration target in a one-person process.

Like reference symbols in the various drawings indicate like elements.

DETAILED DESCRIPTION

Figure 1:
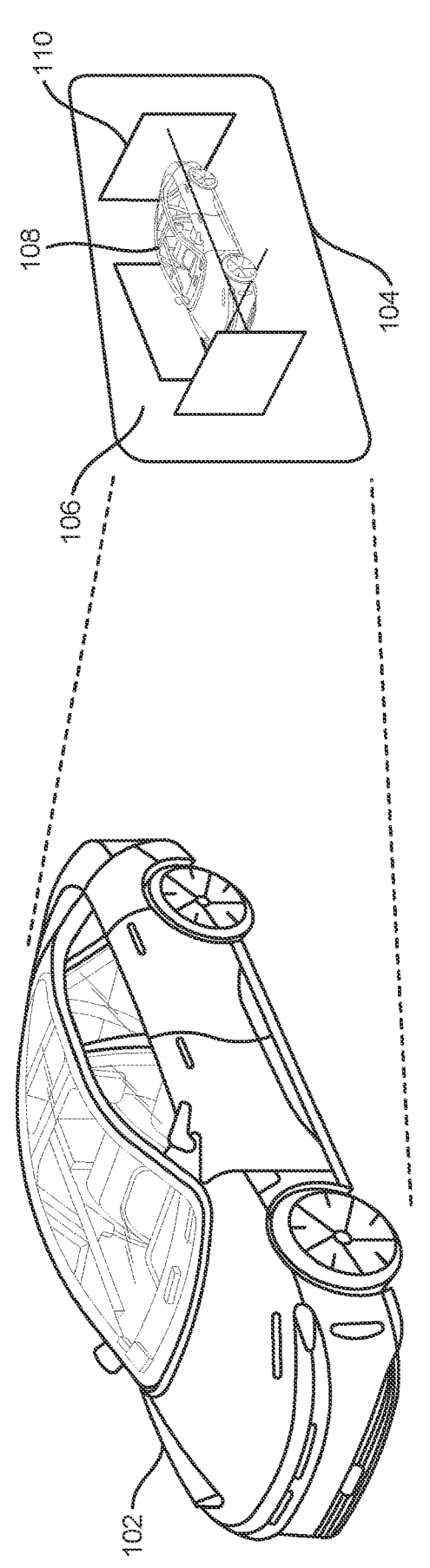
FIG. 1 schematically shows an example of a calibration assistant being used to facilitate ADAS calibration using a mobile device such as a handheld device.

This document describes examples of systems and techniques for calibrating an ADAS of a vehicle. In some implementations, a technician aims a mobile device at a vehicle, and uses a calibration assistant application executed on the mobile device for guidance in orienting one or more physical ADAS targets relative to the vehicle. With the target(s) in place, the vehicle can perform the calibration procedure for its ADAS.

Generally, during an ADAS calibration procedure the ADAS activates some or all of its sensors and registers the signals detected by them in relation to one or more physical ADAS targets near the vehicle. For example, a passive sensor such as a camera can capture an image of a physical ADAS target. As another example, an active sensor such as a light detection and ranging (LiDAR) device or a radar can emit signals from the vehicle and detect the resulting reflections. The detected signals are then processed to generate the calibration settings that should be applied to that particular vehicle.

An ADAS is typically first calibrated during the vehicle manufacturing process. A manufacturing plant may have physical ADAS targets positioned inside a tunnel through which the vehicle is passed during manufacture, so that the vehicle's ADAS can detect the targets and perform its calibration procedure while in the tunnel. Because the tunnel is part of the assembly line, the vehicle's spatial location while inside the tunnel is controlled and not subject to significant variation from vehicle to vehicle. For this reason, there is no need to relocate the physical ADAS targets for every vehicle at the manufacturing plant; rather, each vehicle is brought to the stationary physical ADAS targets to perform the calibration.

After the vehicle has left the manufacturing plant, the ADAS may need subsequent calibration (recalibration) during a service session. For example, an ADAS calibration is performed after the ADAS has been removed or disconnected from the vehicle; after removal of the rear view mirror, which may contain cameras; after removal of the bumper, which may contain a camera and/or a LiDAR; after removal of a front windshield or a rear glass; and/or after removal of the rear bumper. Moreover, at a service center the vehicle's spatial position may not be as precisely controlled as on the assembly line; it is therefore necessary to bring the physical ADAS target into position relative to the particular vehicle before each calibration session. If the physical ADAS target is not at the correct location according to a tolerance specification for the particular ADAS when the calibration procedure is attempted, the calibration will be unsuccessful and an error status may occur. The present subject matter provides improvements in the positioning of the physical ADAS targets relative to the vehicle for a successful calibration procedure. For example, processes according to the present subject matter can be less costly to implement, easier to perform, take up less space, and/or be more precise than earlier approaches.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to an ADAS. In some implementations, an ADAS can perform assisted driving and/or autonomous driving. An ADAS can at least partially automate one or more dynamic driving tasks. An ADAS can operate based in part on the output of one or more sensors typically positioned on, under, or within the vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of an ADAS, not every ADAS is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a thermal sensor; a temperature sensor (e.g., a primary or secondary thermometer); a pressure sensor (e.g., for ambient air or a component of the vehicle); a humidity sensor (e.g., a rain detector); or a seat occupancy sensor.

FIG. 1 schematically shows an example 100 of a calibration assistant being used to facilitate ADAS calibration using a mobile device such as a handheld device. The example 100 can be used with one or more other examples described elsewhere herein. The example 100 involves a vehicle 102 having an ADAS that is to be recalibrated at a service center. A technician uses a calibration assistant running on a mobile device 104 to obtain guidance in placing one or more physical ADAS targets. The mobile device 104 can be a handheld device (e.g., a smartphone or tablet) or a wearable device, to name just two examples. The mobile device 104 presents a camera feed 106 on a display, the camera feed 106 including an image 108 of the vehicle 102. The mobile device 104 can add one or more virtual targets 110 to the camera feed 106. In some implementations, the virtual targets 110 are augmented reality (AR) content to guide the technician in positioning the physical ADAS target(s) relative to the vehicle.

In some implementations, the calibration assistant is specific to a particular operating system (including, but not limited to, Android or iOS), and employs computer vision to detect the vehicle 102 and track it in a real three-dimensional (3D) space, such as using a camera and LiDAR. The calibration assistant can track the vehicle 102 using information about the physical vehicle (e.g., a 3D model such as a computer-aided design (CAD) file). For example, the information/CAD file can include a 3D specification of physical dimensions. The calibration assistant can use virtual tools to map both the 3D space in and around the vehicle 102 and the vehicle 102 itself. The calibration assistant can provide AR guidance for the technician in placing and positioning the physical ADAS targets relative to the vehicle 102. These physical ADAS targets are then used to calibrate multiple different ADAS sensors of the vehicle 102. The example 100 illustrates a significantly easier and less costly way of positioning physical ADAS targets. Earlier approaches, by contrast, may have required expensive hardware, placement of special targets (different from the ADAS targets) on the vehicle itself, and/or may have required use of considerable floor space which may not be available in every service center.

Figure 2:
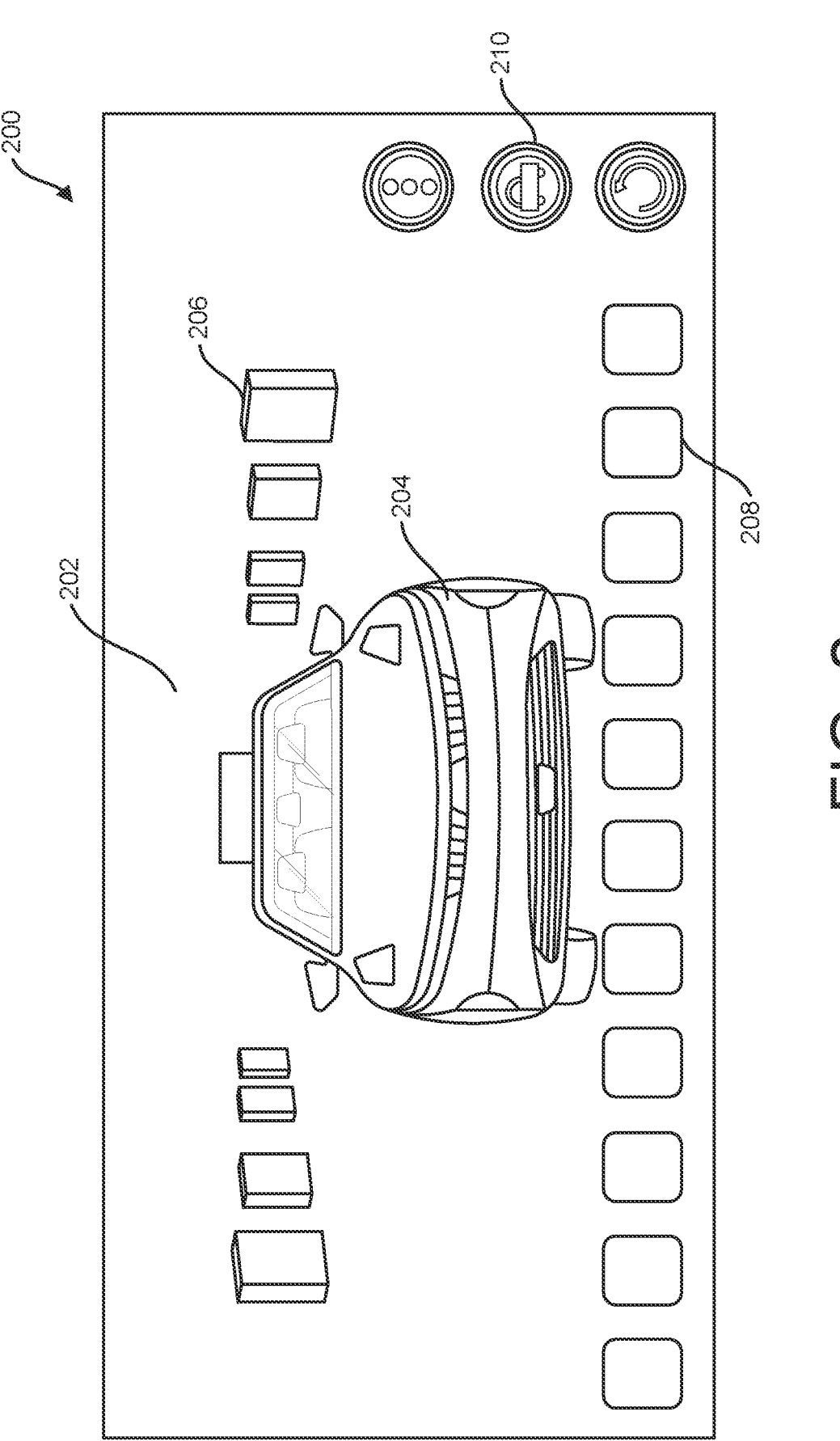
FIG. 2 shows an example of a presentation that can be made by a calibration assistant to facilitate ADAS calibration.

FIG. 2 shows an example of a presentation 200 that can be made by a calibration assistant to facilitate ADAS calibration. The presentation 200 can be used with one or more other examples described elsewhere herein. For example, the mobile device 104 in FIG. 1 can generate the presentation 200 to a technician as AR guidance for placing a physical ADAS target.

Figure 10A:
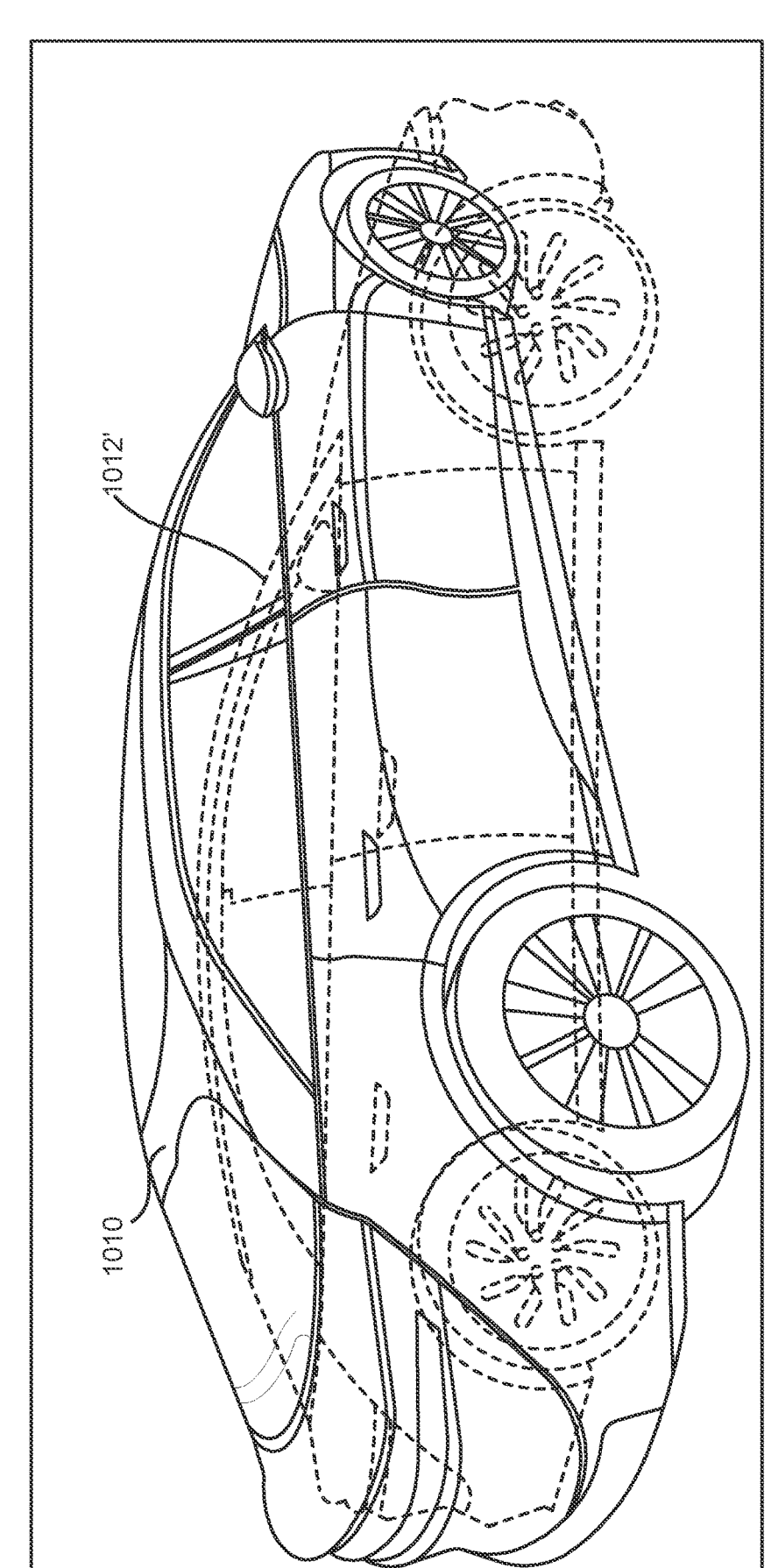
FIGS. 10A-10B and 11-14 show examples of examining a vehicle.

The presentation 200 includes a camera feed 202 that shows an image 204 of a vehicle based on 3D tracking of the physical vehicle in real 3D space. The camera feed 202 is being generated as a live stream of video content as the technician is aiming the mobile device (running a calibration assistant) toward the vehicle. One or more virtual targets 206 can be added to the camera feed 202 as AR content. The virtual targets 206 can be positioned on the screen according to a calibration specification for the ADAS. The virtual targets 206 can have any shape, including, but not limited to, 3D boxes, two-dimensional (2D) planes, and/or lines or points. The calibration assistant can provide one or more controls 208 and/or 210 for manipulating the presentation 200. For example, the control 208 is used to choose which of the virtual targets 206 appear in the presentation 200 by turning the virtual target(s) 206 on or off, and/or to control their appearance. In some implementations, the controls 210 can change the guide views to assist the user to align the vehicle according to their convenience. Examples of guide views are described below with reference to FIG. 10A.

Figure 3:
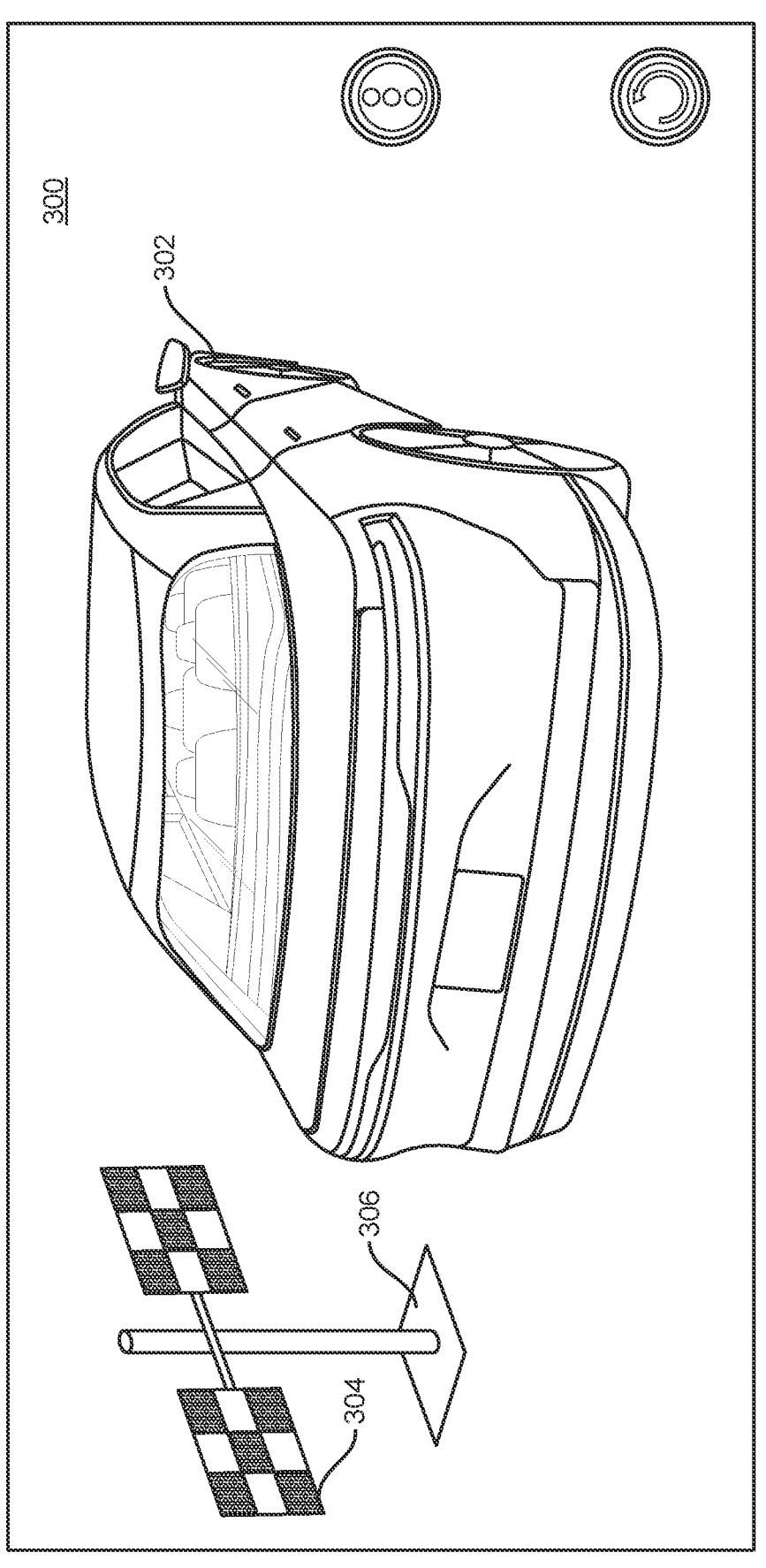
FIGS. 3-6 show examples of using a calibration assistant to facilitate ADAS calibration.

FIGS. 3-6 show examples of using a calibration assistant to facilitate ADAS calibration. The illustrated examples can be used with one or more other examples described elsewhere herein. In FIG. 3, a camera feed 300 is being captured using a mobile device and currently shows an image 302 of a vehicle. A technician is aiming the mobile device toward the vehicle to obtain AU guidance for placing at least one physical target 304 relative to the vehicle. The physical target 304 can have any shape or size compatible with the ADAS of the vehicle. Here, the physical target 304 includes a three-by-three pattern of alternating dark and light areas having the same size. For example, the physical target 304 can be mounted to a stand 306. The stand 306 can have one or more of the physical target 304, and has two instances in this example.

Figure 4:
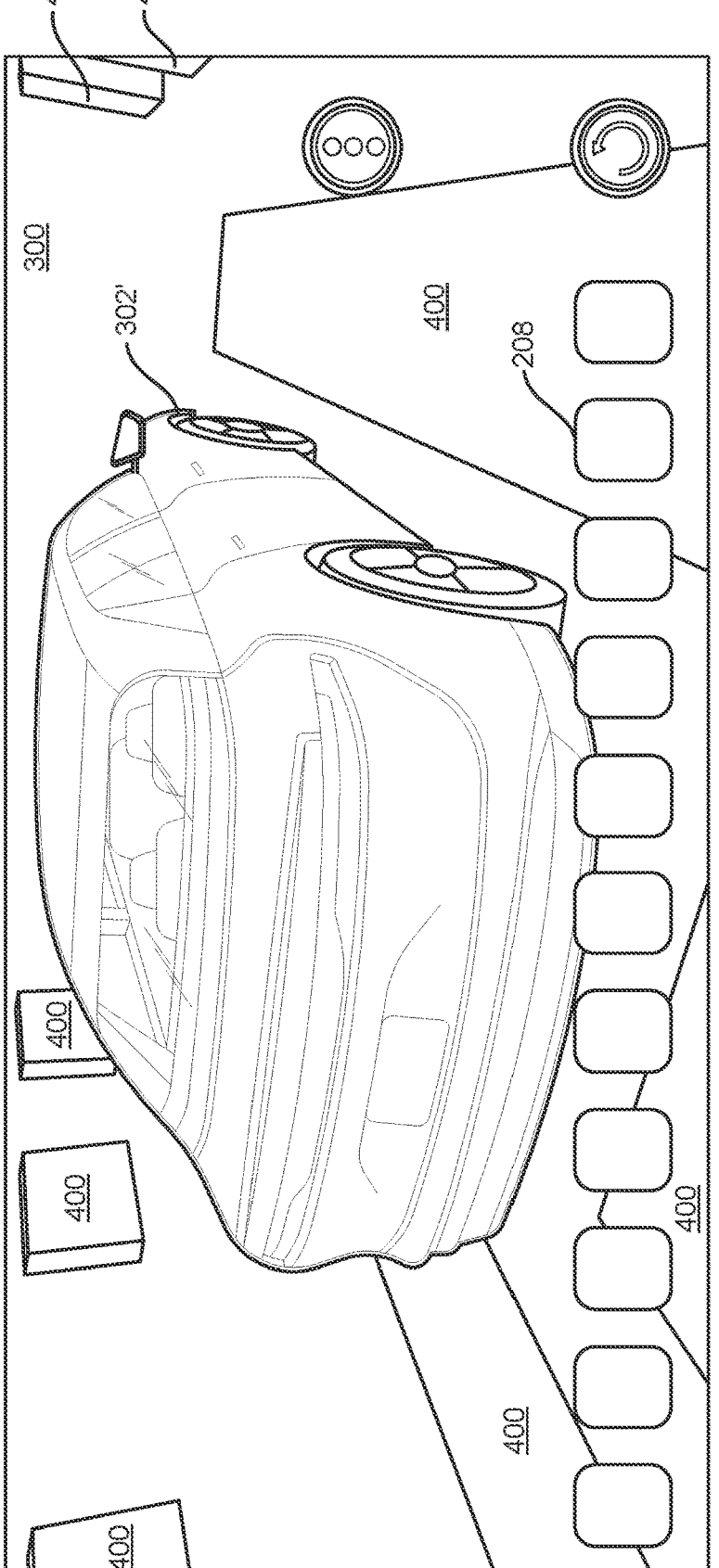

FIG. 4 shows that virtual targets 400 have been added to the camera feed 300 based on tracking the vehicle in 3D space. The camera feed 300 and the virtual targets 400 can be maintained by the mobile device as frame data and continuously updated. Any of the controls 208 can be used to control which of the virtual targets 400 to add to the camera feed 300, and/or to control the appearance of any of the virtual targets 400 (e.g., to select a transparent texture or an opaque texture for the virtual target 400). The image 302 of the vehicle shown in FIG. 3 may here be fully or partially obscured by a virtual overlay 302'. For example, the virtual overlay 302' can cover the entire shape of the vehicle, or can cover only a portion of the shape. For example, the virtual overlay 302' can have the same shape as the vehicle (portion), or a different shape.

Figure 5:
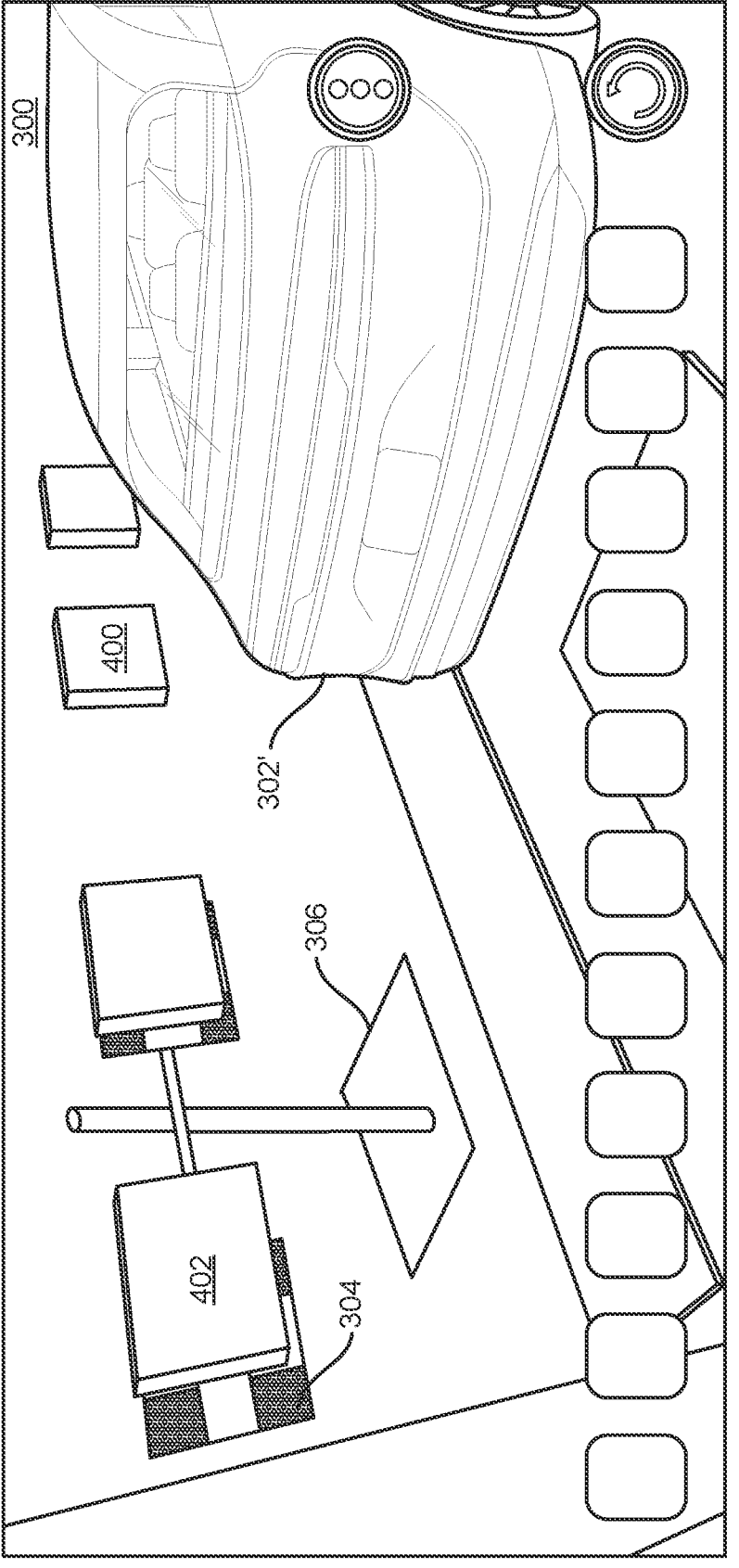

FIG. 5 shows that the camera feed 300 currently includes the virtual overlay 302' for the tracked vehicle, and a virtual target 402, among others of the virtual targets 400. To perform an ADAS calibration successfully, the physical target 304, which is also visible in the camera feed 300, should be positioned at the location of the virtual target 402 (e.g., so that they substantially coincide with each other). Currently, the physical target 304 is not positioned exactly at the location of the virtual target 402. The stand 306 can therefore be relocated under AR guidance of the calibration assistant. In some implementations, the calibration assistant tracks only the vehicle, and not the physical target 304, in the 3D space. The technician can then visually observe the camera feed 300 and the virtual target 402 on the display to see where the physical target 304 should be placed. In other implementations, the calibration assistant can track at least both the vehicle and the physical target 304 in the 3D space, and the calibration assistant can then generate an output indicating whether the physical target 304 is currently positioned in the correct location. For example, the output can be visual and/or audible, or the absence of a specific output can itself be such an indication.

Figure 6:
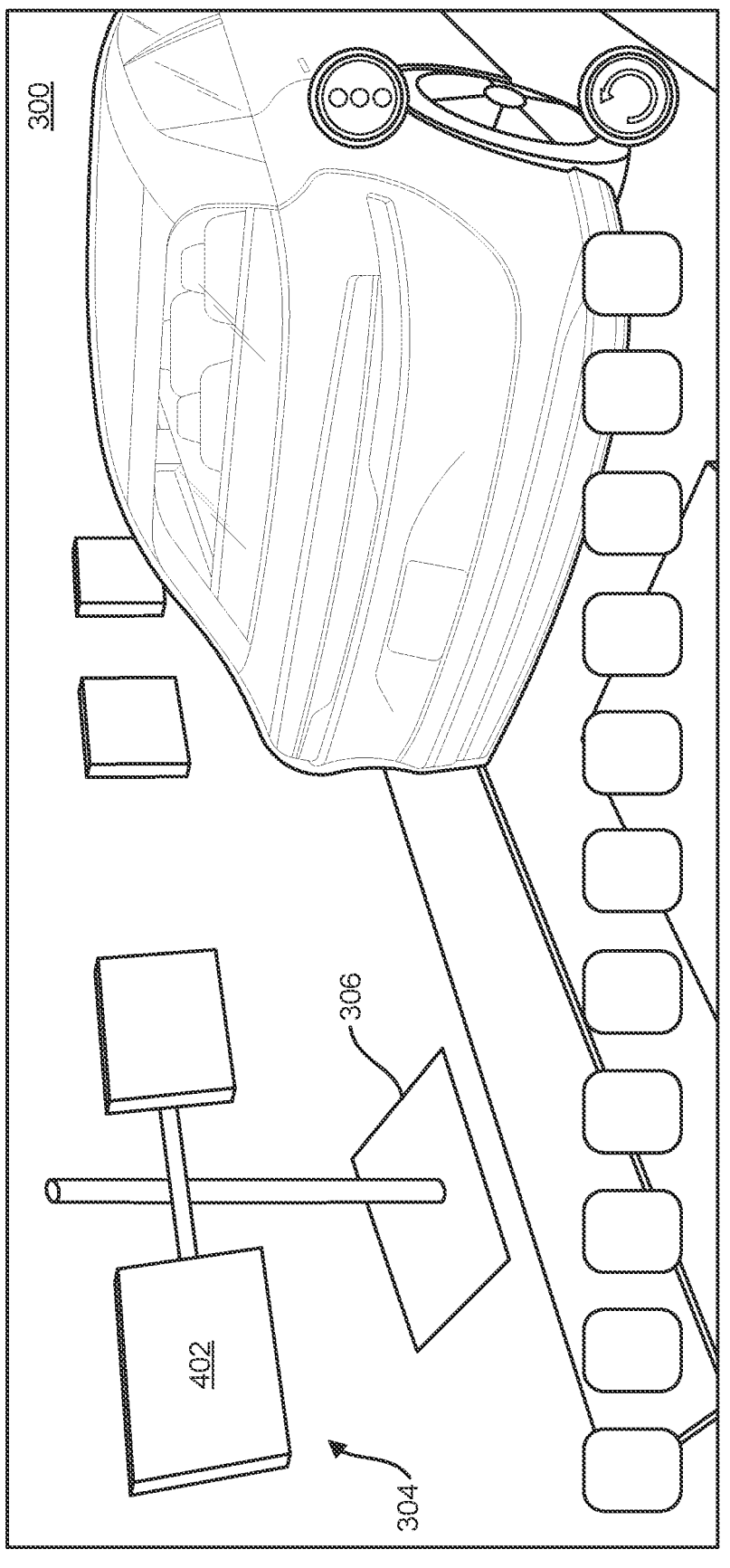

FIG. 6 shows that the physical target 304 has been repositioned relative to the tracked vehicle so as to be at the location of the virtual target 402 (e.g., so that they substantially coincide with each other). The calibration assistant can guide the technician to place the stand 306 so that the physical target 304 is in the correct position. In implementations where also the physical target 304 is tracked in the 3D space, the calibration assistant can generate an output indicating whether the physical target 304 is currently positioned in the correct location. For example, the output can be visual and/or audible, or the absence of a specific output can itself be such an indication. As such, the calibration assistant can track the physical target 304 using information about the physical target 304 (e.g., a 3D model such as a CAD file). The calibration assistant can perform a determination, based on the tracking of the physical target 304, that a position of the physical target 304 substantially coincides with the target location of the virtual target 402.

The calibration process can be initiated when it has been determined (e.g., by the technician through visual inspection, or automatically by the calibration assistant based on tracking) that the position of the physical target 304 substantially coincides with the target location of the virtual target 402. In some implementations, the calibration process can be initiated from the same mobile device that is running the calibration assistant.

Figure 7:
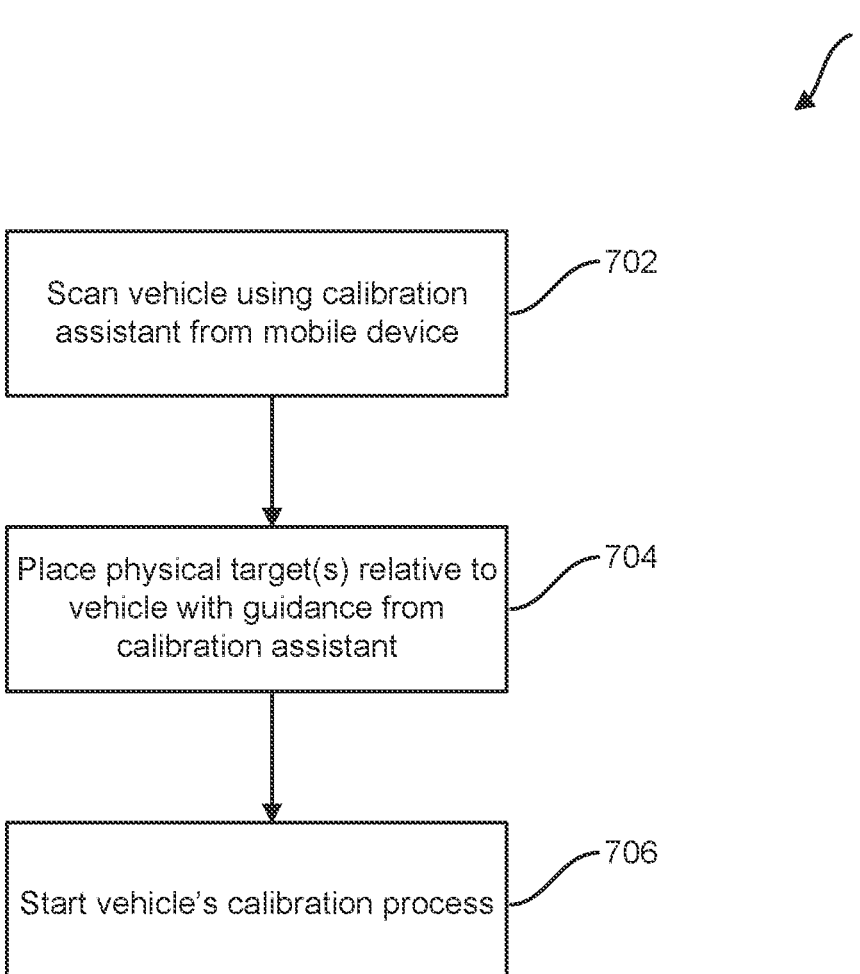
FIG. 7 shows an example of a method of performing ADAS calibration.

FIG. 7 shows an example of a method 700 of performing ADAS calibration. The method 700 can be used with one or more other examples described elsewhere herein. More or fewer operations than shown can be performed. Two or more operations can be performed in a different order unless otherwise indicated.

At operation 702, a vehicle can be scanned using a calibration assistant on a mobile device. For example, a technician can aim the mobile device 104 in FIG. 1 toward the vehicle 102, and can see the virtual targets 206 (FIG. 2) and/or 400 (FIG. 4) and/or 402 (FIGS. 5-6).

At operation 704, the technician can place the physical target(s) relative to the vehicle based on guidance from the calibration assistant. For example, the technician positions the virtual target 304 using the stand 306 in FIG. 5. The positioning can be finished when the technician deems, or the calibration assistant indicates, that the physical target is correctly placed.

At operation 706, the vehicle's ADAS calibration process can be initiated. This can involve running a diagnostic application in the vehicle's computer system. For example, the vehicle will seek to find the physical target using its sensor(s). The tolerance in the placement of the physical target can be specified by settings of the ADAS. In previous approaches, calibration target placement has been done based on locations determined using tape measures. There, the ADAS settings for the target location tolerances were sometimes set with relatively generous limits to account for the variability in the procedure of placing the targets. The present subject matter, on the other hand, can provide a substantially more precise placement. As a result, the ADAS settings for the target location tolerances can be tightened.

The above examples illustrate that a method of calibrating an ADAS for a vehicle can include receiving first information (e.g., a CAD file) by a mobile device that has a camera and a LiDAR device (e.g., the mobile device 104 in FIG. 1). The first information comprises a 3D specification of physical dimensions for the vehicle having the ADAS. The method can include scanning, by the mobile device, the vehicle and a physical target for the ADAS (e.g., the physical target 402 in FIG. 5), the scanning performed with the camera and the LiDAR device after receiving the first information. The scanning generates frame data. The method can include tracking, by the mobile device, the vehicle in the frame data using the first information (e.g., the calibration tracks the image 302 of the vehicle in 3D space based on its CAD file). The method can include generating, by the mobile device, an output indicating whether the physical target is positioned at a target location for the ADAS. For example, a video/audio output can be generated. The output can guide placement of the physical target at its correct location. The method can include initiating, after the output is generated, a calibration process of the ADAS that uses the physical target. For example, the physical target 402 in FIG. 6 can be used for calibrating the ADAS.

FIG. 8 shows an example 800 of a data flow and tech stack for facilitating ADAS calibration using a calibration assistant. The example 800 can be used with one or more other examples described elsewhere herein. To initiate calibration of an ADAS for the vehicle 102, a calibration assistant on the mobile device 104 can be used. The mobile device 104 includes components 802 including at least a camera (e.g., a phone camera) and a LiDAR. Operation 804 indicates that the camera generates frame data, and that the LiDAR produces a depth map. In operation 806, a pixel format conversion and/or flattening can be performed. For example, color data of the frame data can be combined with depth data of the depth map to generate converted frame data 808.

A trained object database 810 can include information about one or more objects that can be tracked. In some implementations, the trained object database 810 specifies the physical dimensions (or other visually recognizable characteristics) of at least a vehicle. A physical target can also be specified for tracking. Objects can be specified using any of multiple different types of files. In some implementations, at least one of the vehicle or the physical target is specified by a CAD file. The vehicle will be tracked as to where in a camera feed the image of the vehicle is located, so that a virtual target can be added to the camera feed at a particular distance from, and orientation relative to, the image of the vehicle. The physical target can be tracked so that a calibration assistant can determine whether and when the location of the physical target substantially coincides with the location of a virtual target.

An object tracker 812 can perform tracking of one or more objects based on the trained object database 810. The object tracker 812 can be an object recognition library. The object tracker 812 can compare the converted frame data 808 with one or more object definitions in the trained object database 810 to track the object(s). The object tracker 812 can create a virtual map of the tracked object(s) in 3D space. The technician can move the mobile device relative to the vehicle (or to another tracked object) to create a more complete virtual map in the cache. As such, operations performed by the object tracker 812 can include detecting an object that is similar to an object found in the trained object database 810, and thereafter tracking the detected object. To track more than one object (e.g., both the vehicle and a physical target), the object tracker 812 can perform sequential tracking so that it maintains tracking of both objects simultaneously. For example, another thread can be run in the object tracker 812 to handle more than one tracked object.

A rendering stage 814 uses the converted frame data 808 and the tracking information of the object tracker 812 to render one or more virtual features. For example, any of the virtual targets 206 (FIG. 2), 400 (FIG. 4), and/or 402 (FIGS. 5-6) can be rendered. As another example, a virtual overlay can be rendered.

A Unity-based ADAS Assistant Calibration Assistant application 816 can receive and use event-based signals from the converted frame data 808 and the object tracker 812 and can provide multiple handles or features using the processed frame data. The ADAS Calibration Assistant application 816 is built using Unity, which is a 3D Graphics application development framework for building Graphics on top of the processed Frame data. The Unity-based ADAS Assistant Calibration Assistant application 816 can query a Tracking State Object (e.g., whether its status is tracked or partially tracked), update the application logic, render graphics on top of the frame data containing tracking data, and render the virtual targets in 3D space relative to the tracked object. Screens 818 and 820 are screenshots from a certain user session. For example, screen 818 indicates a user session with an actively tracked vehicle and all of the virtual targets enabled. As another example, screen 820 indicates a user session with an actively tracked vehicle and all of the virtual targets enabled except the virtual floor mats targets.

FIGS. 9A-9B show examples of positioning an ADAS calibration target in a one-person process. The examples involve a service center 900 (here viewed from above) and the mobile device 104, and can be used with one or more other examples described elsewhere herein. In these illustrations, the mobile device 104 is shown both in the service center 900 and also separately to clarify how a technician uses the mobile device 104 and observes its output.

A vehicle 902 is present at the service center 900 and an ADAS calibration should be performed for the vehicle 902. The physical target 304 mounted to the stand 306 is present at the service center 900. The technician is holding the mobile device 104 which includes a camera 904 and a LiDAR 906. As another example, the mobile device 104 can be mounted on a tripod or other stand. For example, the camera 904 and the LiDAR 906 can both be mounted on a front or a rear of the mobile device 104. The camera 904 and the LiDAR 906 currently have a view of both the vehicle 902 and the physical target 304. The mobile device 104 presents a screen 908 that includes a camera feed of the camera 904 and one or more virtual features. The screen 908 includes an image 910 of the vehicle 902, and an image 912 of the physical target 304. The calibration assistant can track the vehicle 902 and optionally also the physical target 304. Based on tracking, the calibration assistant can add the virtual target 402 to the screen 908 at a specific distance and orientation to the image 910 of the vehicle 902. The virtual target 402 is here also shown in the service center 900 for clarity as to the spatial relationship. The mobile device 104 can provide an output (e.g., the screen 908, observable by the technician) indicating that the physical target 304 is currently not positioned at the location of the virtual target 402.

The technician can move the stand 306 to relocate the physical target 304, based on the output from the mobile device 104. The mobile device 104 can present a screen 914 in which the image 912 of the physical target 304 substantially coincides with the virtual target 402. For example, if the physical target 304 has a sufficiently long handle for being manipulated, or if the physical target 304 is wirelessly controllable, the technician can hold the mobile device 104 in one hand, and observe the screens 908 and 914, while moving the stand 306 with the other hand. As another example, the technician can view the screens on the mobile device 104 mounted on a stand, while maneuvering the stand 306 remotely. As another example, the screens 908 and 914 of the mobile device 104 mounted on a stand itself can be mirrored to another display device that is visible to the technician during the operation. If the mobile device 104 tracks both the vehicle 902 and the physical target 304, the calibration assistant can determine when the physical target 304 has been placed in the current position. As such, a calibration assistant on the mobile device 104 can facilitate a one-person process for ADAS calibration.

FIGS. 10A-10B and 11-14 show examples 1000-1008 of examining a vehicle 1010. Such examination can allow a technician to gain insight about the vehicle for purposes of repairing, evaluating, or otherwise investigating the vehicle 1010. In the example 1000, the vehicle 1010 is visible in a camera feed captured using a mobile device that also has a LiDAR. The mobile device can access object information about the vehicle 1010 (e.g., a CAD file) and begin tracking the vehicle 1010 in 3D space as the mobile device is moved. In the example 1000, a virtual overlay 1012' is added to the camera feed which acts as a guide to align the vehicle to be detected. The virtual overlay 1012' here has the same spatial orientation (e.g., nose to the right, rear to the left) as the vehicle 1010, but has not yet been fitted to, or precisely aligned with, the vehicle 1010. With reference again briefly to FIG. 2, the virtual overlay 1012' can be a guide view that is presented in response to the user actuating one of the controls 210 to choose between available guide views. Here, the guide view is a side view of the vehicle. Other guide views can be available, including but not limited to a front view or a rear view. For example, if there is not enough physical space in the current location to align the vehicle from a side view, the user can instead choose the front-view guide view or the rear-view guide view for aligning the vehicle.

Figure 10B:
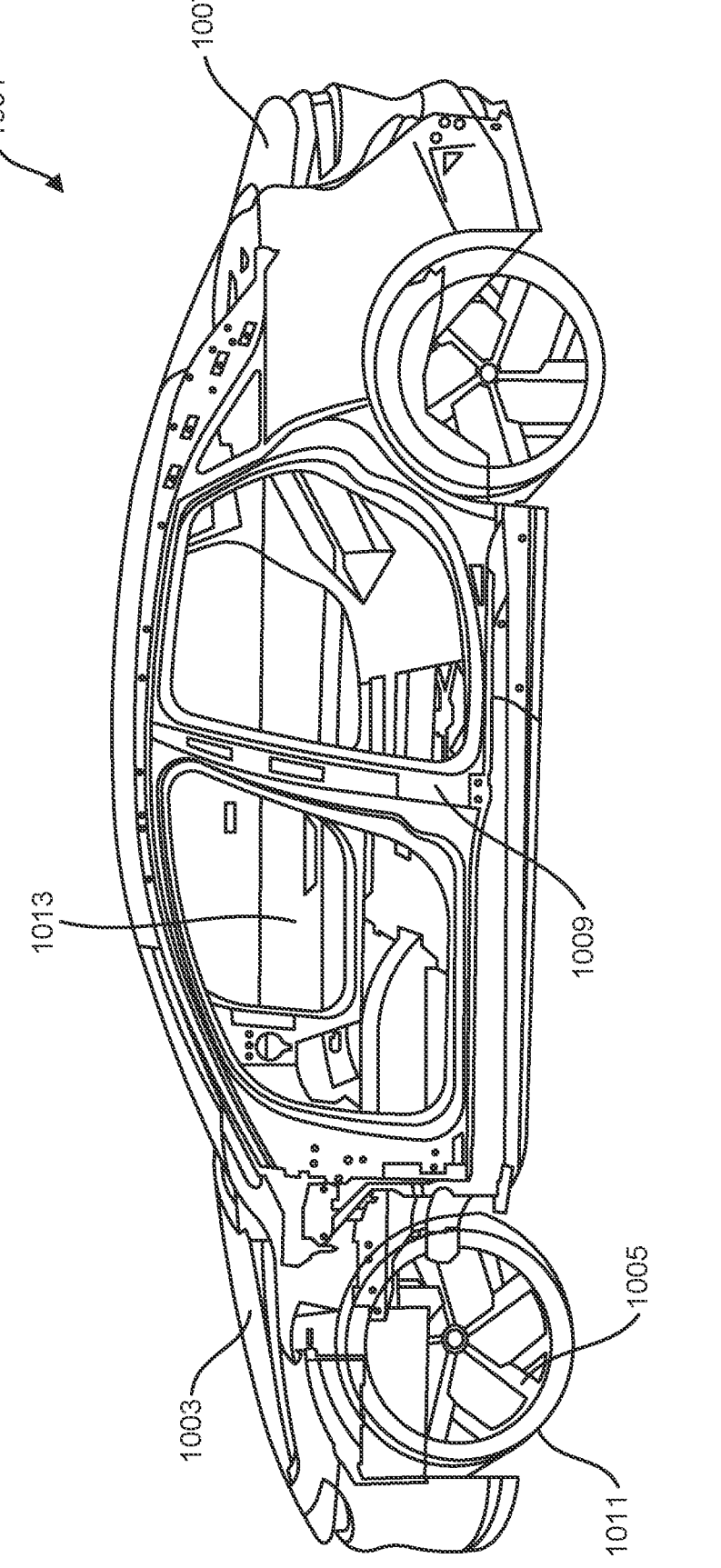
Figure 11:
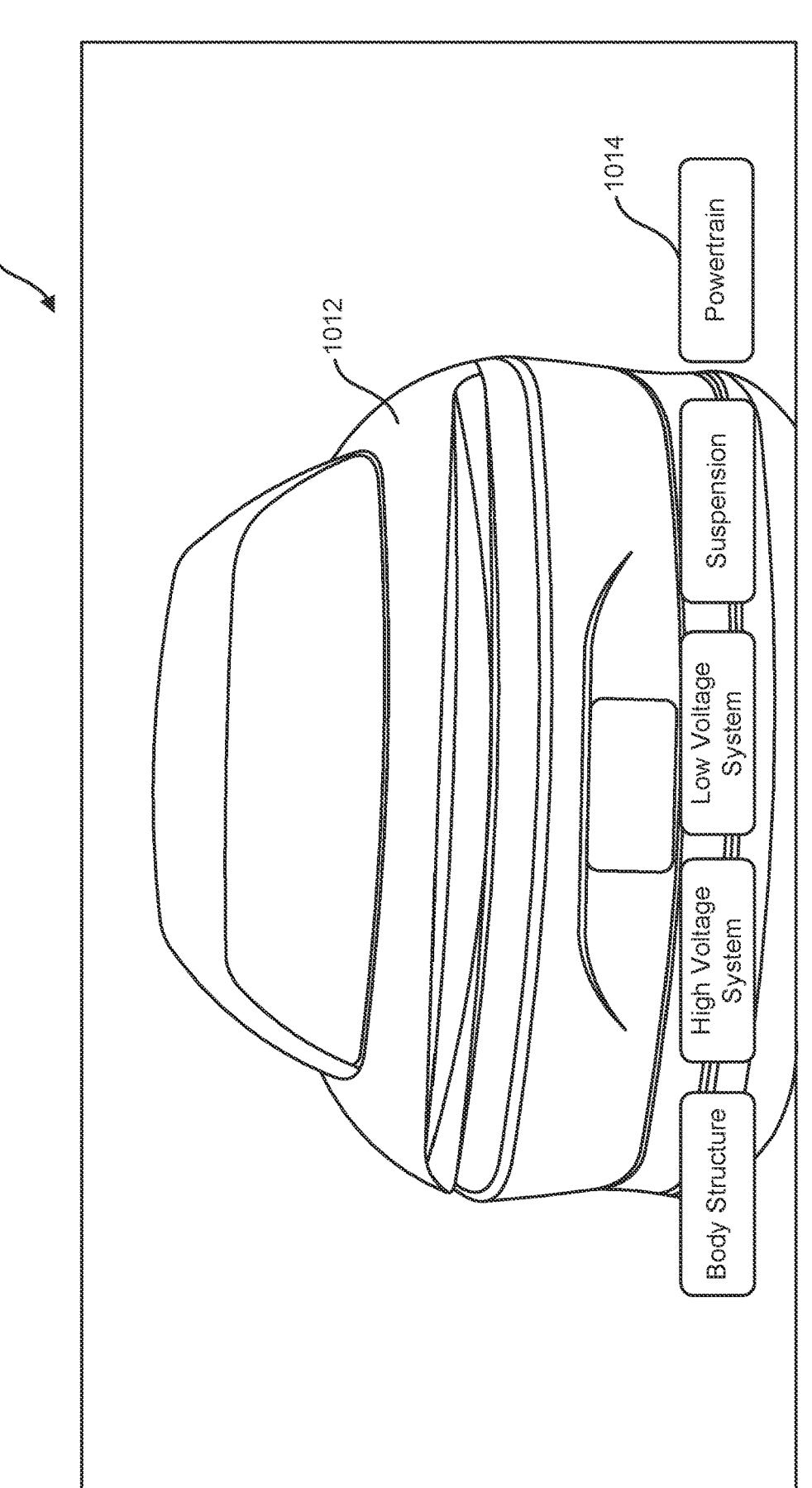
Figure 12:
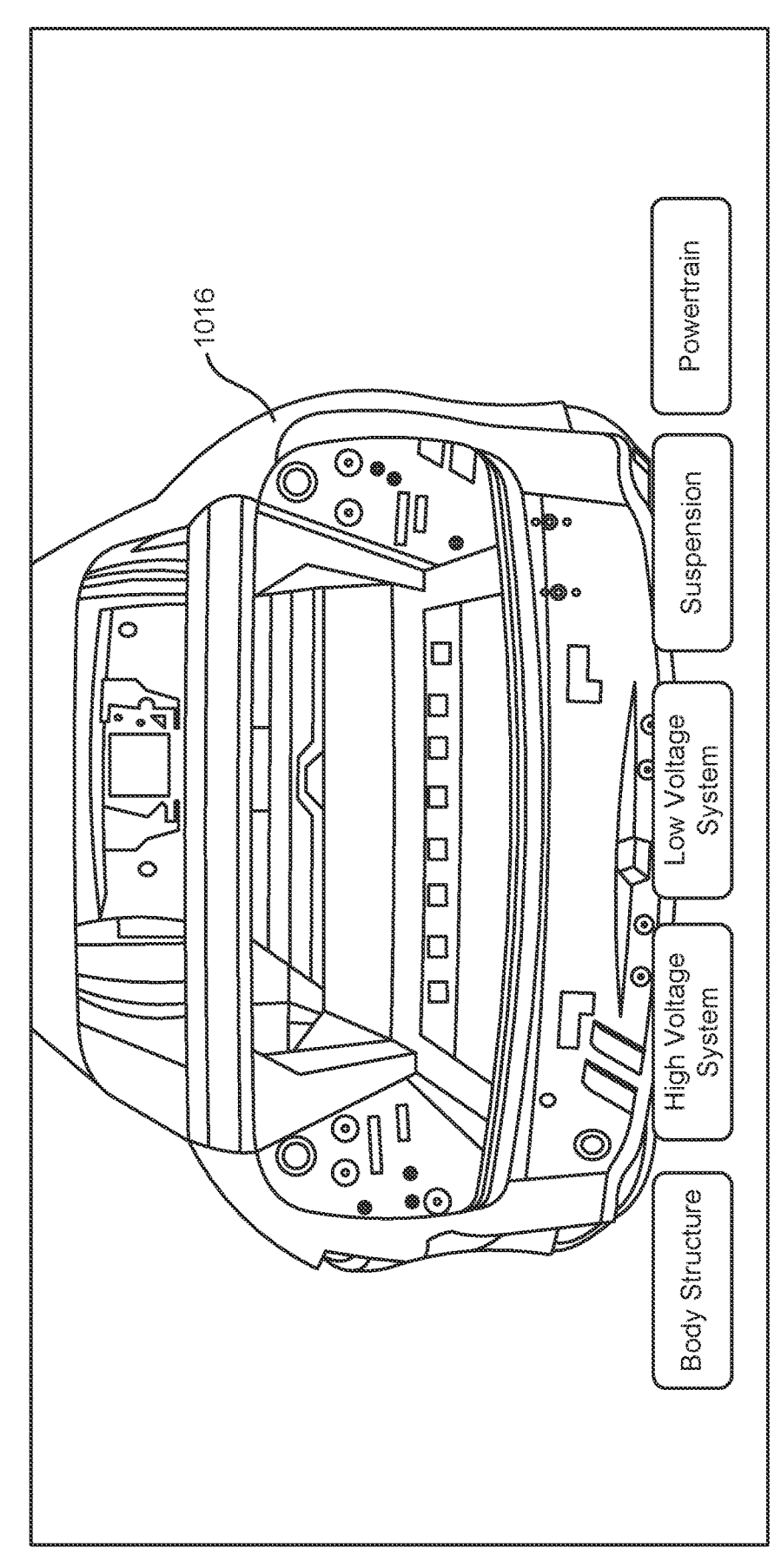
Figure 13:
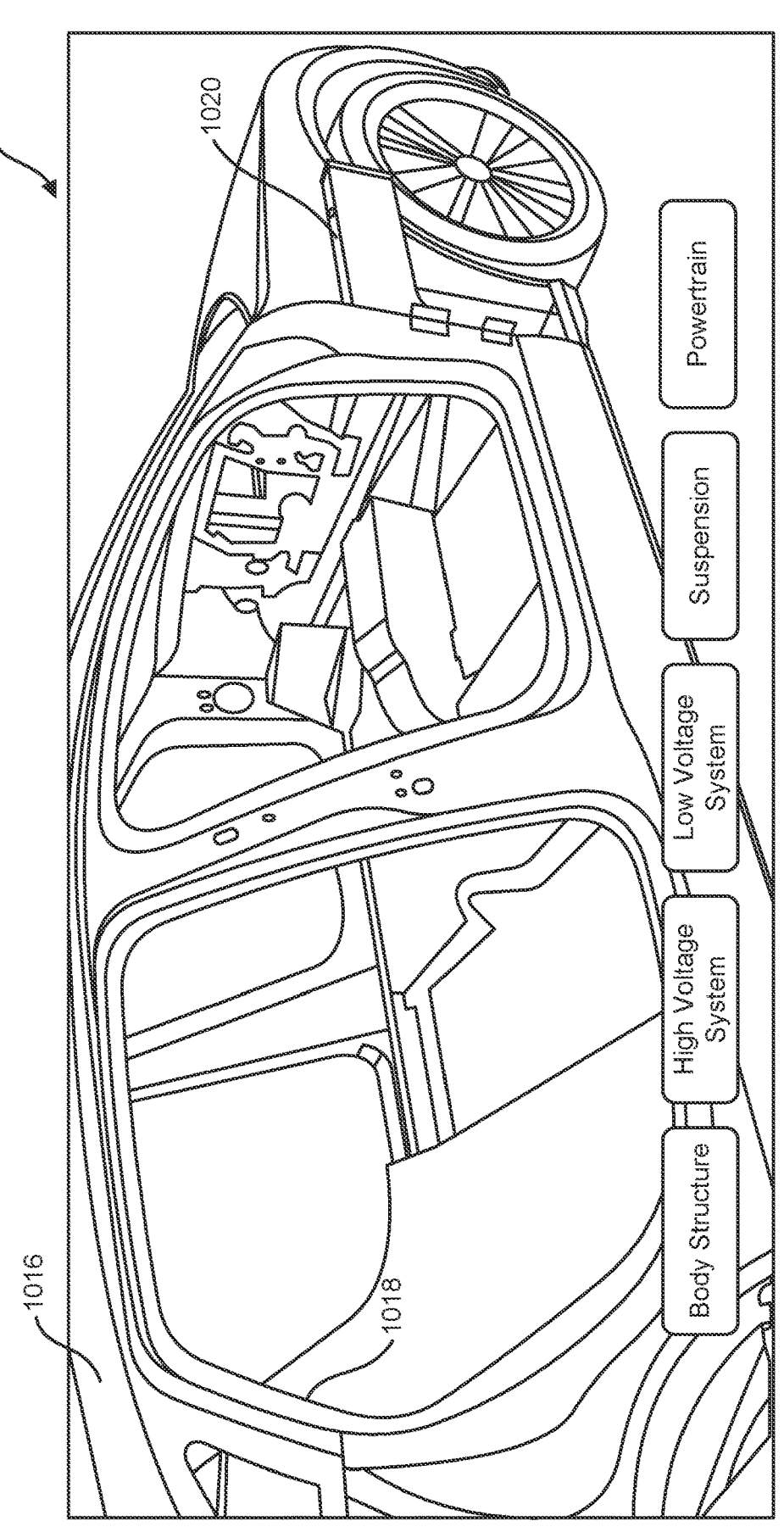
Figure 14:
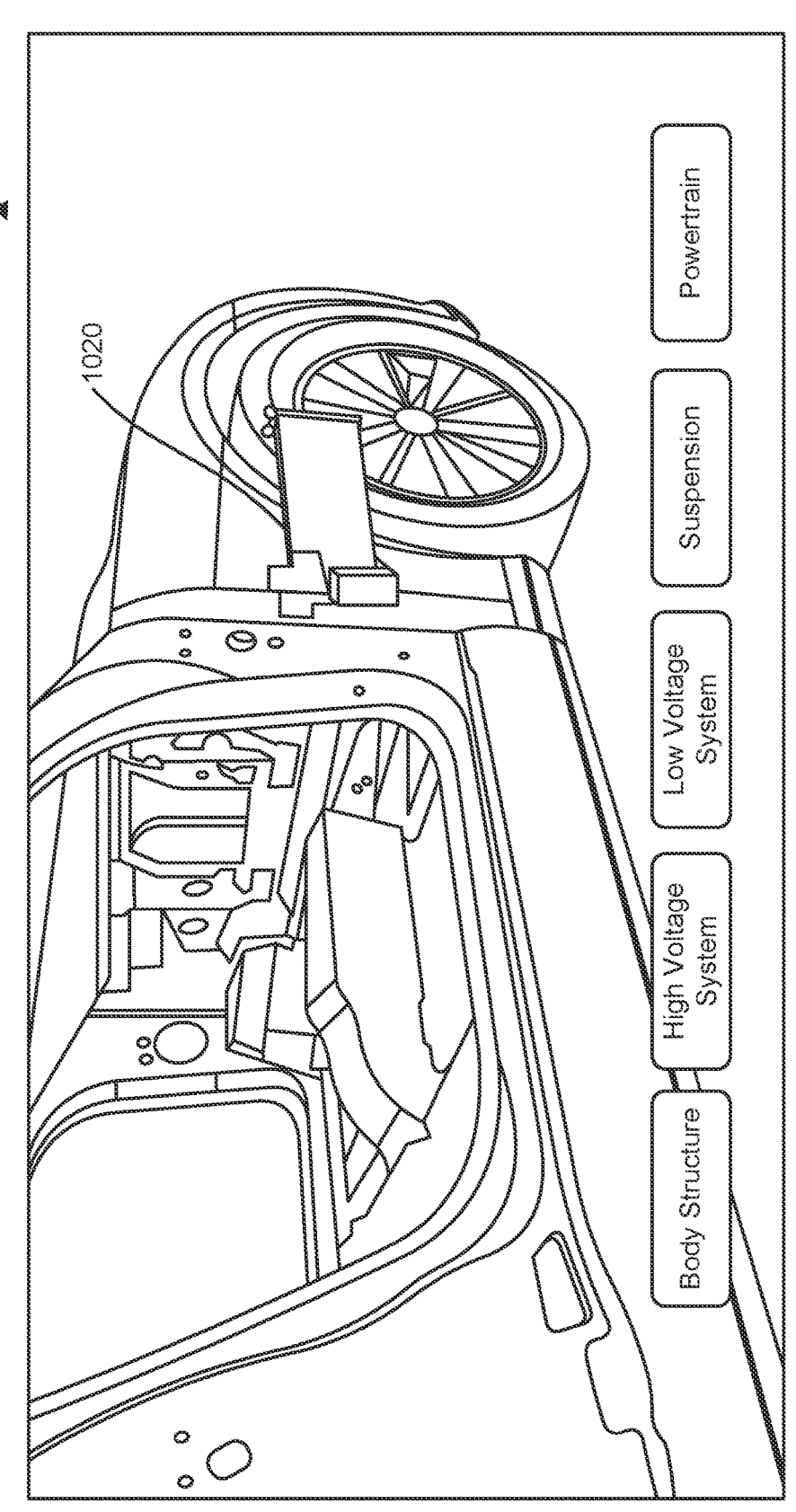

The view shown on the device can include photographic content, augmented reality (AR) content, or a combination of both. FIG. 10B shows the example 1001 in which a hood 1003, a wheel 1005, and a trunk lid 1007 are part of the actual vehicle (i.e., photographic content). A vehicle body structure 1009 and a wheel periphery 1011, on the other hand are AR content added as an overlay on the photographic image. As such, both photographic content and AR content can be shown together. For example, a door exterior 1013 of the photographic content is here visible in an area that the AR content presents as a door opening.

The wheel periphery 1011 is here aligned with the circumference of the wheel 1005 of the photographic content. For example, this can allow verification that the alignment of the AR content to the photographic content is done correctly to be performed. One or more other portions of the vehicle can also or instead be provided with a periphery of AR content (e.g., the hood 1003 or the trunk lid 1007).

In the example 1002, a virtual overlay 1012 is instead added to the camera feed based on tracking the vehicle using the camera frame data and LiDAR depth map. For example, the virtual overlay 1012 can give the vehicle a different appearance (e.g., color, shape, or other texture) than in the example 1000. Controls 1014 can be provided. For example, each of the controls 1014 is associated with one or more physical components of the vehicle 1010. Such physical components can include, but are not limited to, a body structure, a high-voltage system, a low-voltage system, a suspension, or a powertrain. The control 1014 can be actuated to overlay a 3D representation of the physical component on the camera feed in a correct spatial position based on tracking the vehicle.

In the example 1004, a control has been actuated to add a virtual overlay 1016 to the vehicle that represents its body structures. The example 1006, in turn, illustrates that the virtual overlay 1016 can represent a door opening 1018 of the vehicle, and a structural member 1020 (e.g., a crush rail). The door opening 1018 and the structural member 1020 of the virtual overlay 1016 are currently positioned relative to the vehicle based on the tracking in 3D space. The example 1008, finally, indicates that the structural member 1020 is visible in the AR view on the mobile device. If the vehicle were currently disassembled so that the physical member (of which the structural member 1020 is a virtual 3D representation) were visible, the technician could observe both that physical member and the structural member 1020 on the screen. If these objects do not coincide, the technician can conclude that the physical member is not in its designed position and may have been damaged or improperly installed. As such, the examination can be performed to detect physical damage on the vehicle.

Figure 15:
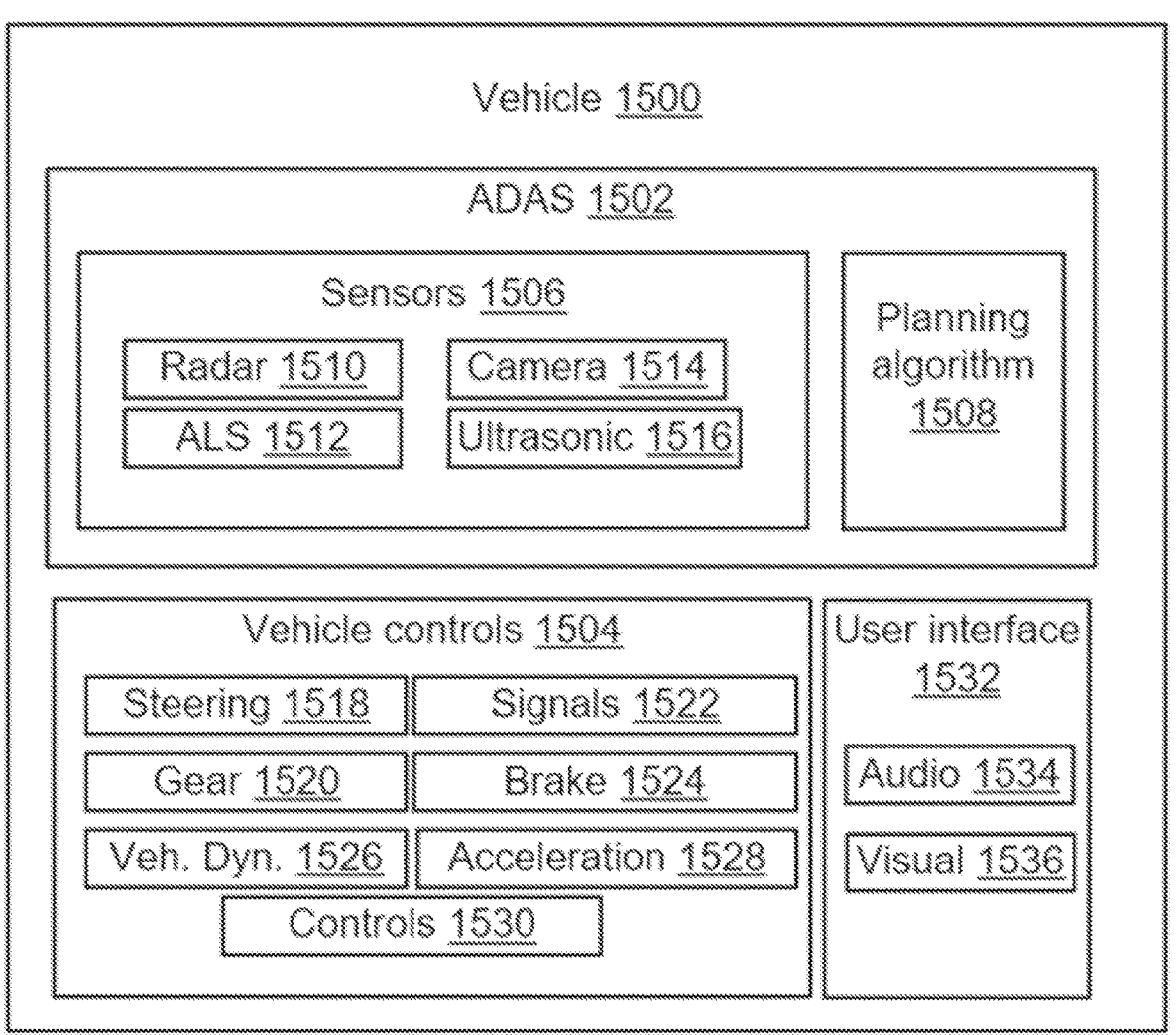
FIG. 15 shows an example of a vehicle.

FIG. 15 shows an example of a vehicle 1500. The vehicle 1500 can be used with one or more other examples described elsewhere herein. The vehicle 1500 includes an ADAS 1502 and vehicle controls 1504. The ADAS 1502 can be implemented using some or all components described with reference to FIG. 16 below. The ADAS 1502 includes sensors 1506 and a planning algorithm 1508. Other aspects that the vehicle 1500 may include, including, but not limited to, other components of the vehicle 1500 where the ADAS 1502 may be implemented, are omitted here for simplicity.

The sensors 1506 are here described as also including appropriate circuitry and/or executable programming for processing sensor output and performing a detection based on the processing. The sensors 1506 can include a radar 1510. In some implementations, the radar 1510 can include any object detection system that is based at least in part on radio waves. For example, the radar 1510 can be oriented in a forward direction relative to the vehicle and can be used for detecting at least a distance to one or more other objects (e.g., another vehicle). The radar 1510 can detect the surroundings of the vehicle 1500 by sensing the presence of an object in relation to the vehicle 1500.

The sensors 1506 can include an active light sensor 1512. In some implementations, the active light sensor 1512 can include any object detection system that is based at least in part on laser light. For example, the active light sensor 1512 can be oriented in any direction relative to the vehicle and can be used for detecting at least a distance to one or more other objects (e.g., a lane boundary). The active light sensor 1512 can detect the surroundings of the vehicle 1500 by sensing the presence of an object in relation to the vehicle 1500. The active light sensor 1512 can be a scanning LiDAR or a non-scanning LiDAR (e.g., a flash LiDAR), to name just two examples.

The sensors 1506 can include a camera 1514. In some implementations, the camera 1514 can include any image sensor whose signal(s) the vehicle 1500 takes into account. For example, the camera 1514 can be oriented in any direction relative to the vehicle and can be used for detecting vehicles, lanes, lane markings, curbs, and/or road signage. The camera 1514 can detect the surroundings of the vehicle 1500 by visually registering a circumstance in relation to the vehicle 1500.

The sensors 1506 can include an ultrasonic sensor 1516. In some implementations, the ultrasonic sensor 1516 can include any transmitter, receiver, and/or transceiver used in detecting at least the proximity of an object based on ultrasound. For example, the ultrasonic sensor 1516 can be positioned at or near an outer surface of the vehicle. The ultrasonic sensor 1516 can detect the surroundings of the vehicle 1500 by sensing the presence of an object in relation to the vehicle 1500.

Any of the sensors 1506 alone, or two or more of the sensors 1506 collectively, can detect, whether or not the ADAS 1502 is controlling motion of the vehicle 1500, the surroundings of the vehicle 1500. In some implementations, at least one of the sensors 1506 can generate an output that is taken into account in providing an alert or other prompt to a driver, and/or in controlling motion of the vehicle 1500. For example, the output of two or more sensors (e.g., the outputs of the radar 1510, the active light sensor 1512, and the camera 1514) can be combined. In some implementations, one or more other types of sensors can additionally or instead be included in the sensors 1506.

The planning algorithm 1508 can plan for the ADAS 1502 to perform one or more actions, or to not perform any action, in response to monitoring of the surroundings of the vehicle 1500 and/or an input by the driver. The output of one or more of the sensors 1506 can be taken into account. In some implementations, the planning algorithm 1508 can perform motion planning and/or plan a trajectory for the vehicle 1500.

The vehicle controls 1504 can include a steering control 1518. In some implementations, the ADAS 1502 and/or another driver of the vehicle 1500 controls the trajectory of the vehicle 1500 by adjusting a steering angle of at least one wheel by way of manipulating the steering control 1518. The steering control 1518 can be configured for controlling the steering angle though a mechanical connection between the steering control 1518 and the adjustable wheel, or can be part of a steer-by-wire system.

The vehicle controls 1504 can include a gear control 1520. In some implementations, the ADAS 1502 and/or another driver of the vehicle 1500 uses the gear control 1520 to choose from among multiple operating modes of a vehicle (e.g., a Drive mode, a Neutral mode, or a Park mode). For example, the gear control 1520 can be used to control an automatic transmission in the vehicle 1500.

The vehicle controls 1504 can include signal controls 1522. In some implementations, the signal controls 1522 can control one or more signals that the vehicle 1500 can generate. For example, the signal controls 1522 can control headlights, a turn signal and/or a horn of the vehicle 1500.

The vehicle controls 1504 can include brake controls 1524. In some implementations, the brake controls 1524 can control one or more types of braking systems designed to slow down the vehicle, stop the vehicle, and/or maintain the vehicle at a standstill when stopped. For example, the brake controls 1524 can be actuated by the ADAS 1502. As another example, the brake controls 1524 can be actuated by the driver using a brake pedal.

The vehicle controls 1504 can include a vehicle dynamic system 1526. In some implementations, the vehicle dynamic system 1526 can control one or more functions of the vehicle 1500 in addition to, or in the absence of, or in lieu of, the driver's control. For example, when the vehicle comes to a stop on a hill, the vehicle dynamic system 1526 can hold the vehicle at standstill if the driver does not activate the brake control 1524 (e.g., step on the brake pedal).

The vehicle controls 1504 can include an acceleration control 1528. In some implementations, the acceleration control 1528 can control one or more types of propulsion motor of the vehicle. For example, the acceleration control 1528 can control the electric motor(s) and/or the internal-combustion motor(s) of the vehicle 1500.

The vehicle controls can further include one or more additional controls, here collectively illustrated as controls 1530. The controls 1530 can provide for vehicle control of one or more functions or components. In some implementations, the controls 1530 can regulate one or more sensors of the vehicle 1500. For example, the vehicle 1500 can adjust the settings (e.g., frame rates and/or resolutions) of the sensor(s) based on surrounding data measured by the sensor(s) and/or any other sensor of the vehicle 1500.

The vehicle 1500 can include a user interface 1532. The user interface 1532 can include an audio interface 1534 that can be used for generating an alert regarding a detection. In some implementations, the audio interface 1534 can include one or more speakers positioned in the passenger compartment. For example, the audio interface 1534 can at least in part operate together with an infotainment system in the vehicle.

The user interface 1532 can include a visual interface 1536 that can be used for generating an alert regarding a detection. In some implementations, the visual interface 1536 can include at least one display device in the passenger compartment of the vehicle 1500. For example, the visual interface 1536 can include a touchscreen device and/or an instrument cluster display.

Figure 16:
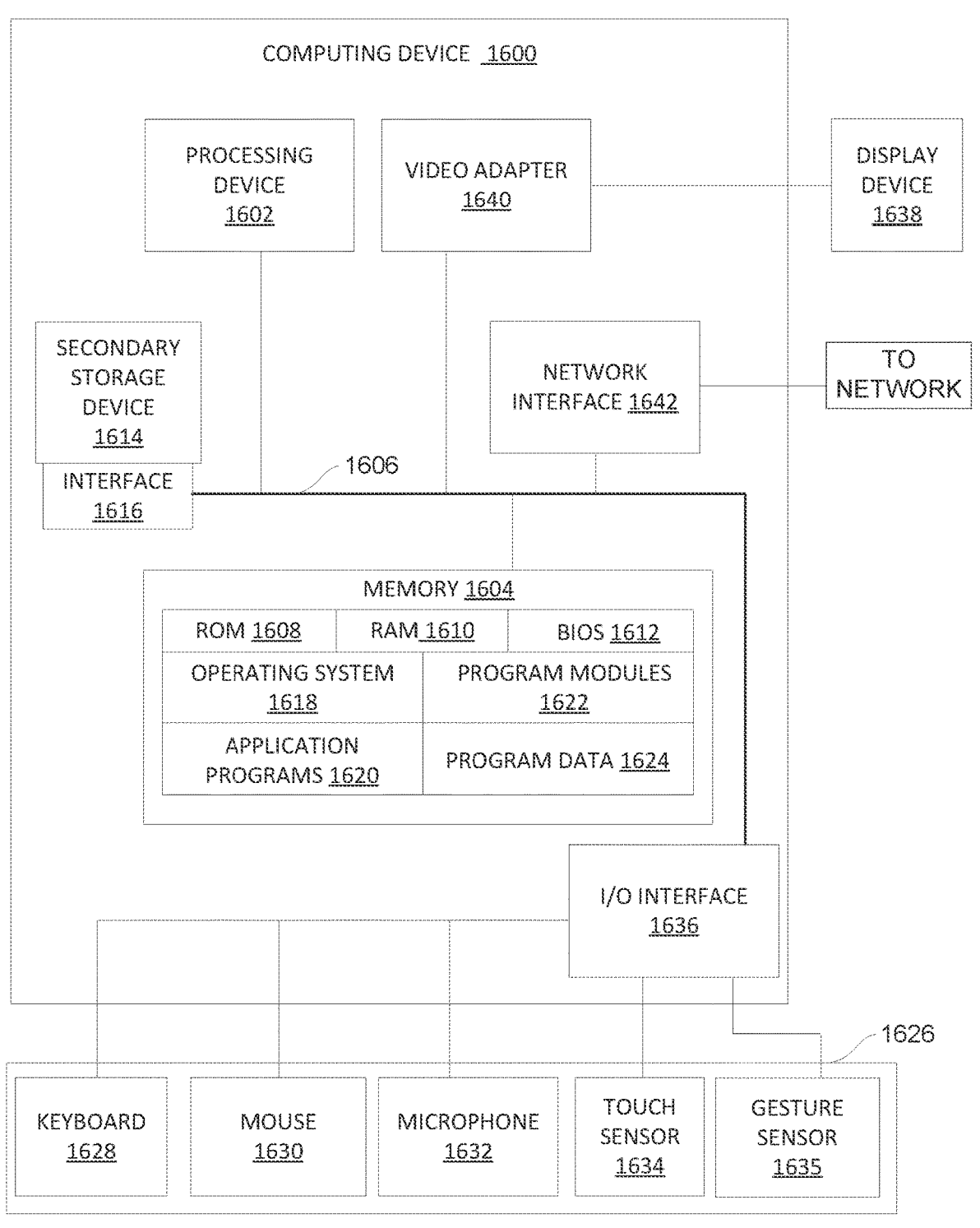
FIG. 16 illustrates an example architecture of a computing device that can be used to implement aspects of the present disclosure.

FIG. 16 illustrates an example architecture of a computing device 1600 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 16 can be used to execute the operating system, application programs, and/or software modules (including the software engines) described herein.

The computing device 1600 includes, in some embodiments, at least one processing device 1602 (e.g., a processor), such as a central processing unit (CPU). A variety of processing devices are available from a variety of manufacturers, for example, Intel or Advanced Micro Devices. In this example, the computing device 1600 also includes a system memory 1604, and a system bus 1606 that couples various system components including the system memory 1604 to the processing device 1602. The system bus 1606 is one of any number of types of bus structures that can be used, including, but not limited to, a memory bus, or memory controller; a peripheral bus; and a local bus using any of a variety of bus architectures.

Examples of computing devices that can be implemented using the computing device 1600 include a desktop computer, a laptop computer, a tablet computer, a mobile computing device (such as a smart phone, a touchpad mobile digital device, or other mobile devices), or other devices configured to process digital instructions.

The system memory 1604 includes read only memory 1608 and random access memory 1610. A basic input/output system 1612 containing the basic routines that act to transfer information within computing device 1600, such as during start up, can be stored in the read only memory 1608.

The computing device 1600 also includes a secondary storage device 1614 in some embodiments, such as a hard disk drive, for storing digital data. The secondary storage device 1614 is connected to the system bus 1606 by a secondary storage interface 1616. The secondary storage device 1614 and its associated computer readable media provide nonvolatile and non-transitory storage of computer readable instructions (including application programs and program modules), data structures, and other data for the computing device 1600.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1614 and/or system memory 1604, including an operating system 1618, one or more application programs 1620, other program modules 1622 (such as the software engines described herein), and program data 1624. The computing device 1600 can utilize any suitable operating system.

In some embodiments, a user provides inputs to the computing device 1600 through one or more input devices 1626. Examples of input devices 1626 include a keyboard 1628, mouse 1630, microphone 1632 (e.g., for voice and/or other audio input), touch sensor 1634 (such as a touchpad or touch sensitive display), and gesture sensor 1635 (e.g., for gestural input). In some implementations, the input device(s) 1626 provide detection based on presence, proximity, and/or motion. Other embodiments include other input devices 1626. The input devices can be connected to the processing device 1602 through an input/output interface 1636 that is coupled to the system bus 1606. These input devices 1626 can be connected by any number of input/output interfaces, such as a parallel port, serial port, game port, or a universal serial bus. Wireless communication between input devices 1626 and the input/output interface 1636 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1638, such as a monitor, liquid crystal display device, light-emitting diode display device, projector, or touch sensitive display device, is also connected to the system bus 1606 via an interface, such as a video adapter 1640. In addition to the display device 1638, the computing device 1600 can include various other peripheral devices (not shown), such as speakers or a printer.

The computing device 1600 can be connected to one or more networks through a network interface 1642. The network interface 1642 can provide for wired and/or wireless communication. In some implementations, the network interface 1642 can include one or more antennas for transmitting and/or receiving wireless signals. When used in a local area networking environment or a wide area networking environment (such as the Internet), the network interface 1642 can include an Ethernet interface. Other possible embodiments use other communication devices. For example, some embodiments of the computing device 1600 include a modem for communicating across the network.

The computing device 1600 can include at least some form of computer readable media. Computer readable media includes any available media that can be accessed by the computing device 1600. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1600.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 16 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 1600 can be characterized as an ADAS computer. For example, the computing device 1600 can include one or more components sometimes used for processing tasks that occur in the field of artificial intelligence (AI). The computing device 1600 then includes sufficient proceeding power and necessary support architecture for the demands of ADAS or AI in general. For example, the processing device 1602 can include a multicore architecture. As another example, the computing device 1600 can include one or more co-processors in addition to, or as part of, the processing device 1602. In some implementations, at least one hardware accelerator can be coupled to the system bus 1606. For example, a graphics processing unit can be used. In some implementations, the computing device 1600 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of calibrating an advanced driver assistance system (ADAS) for a vehicle, the method comprising:

receiving first information by a mobile device that has a camera and a light detection and ranging (LiDAR) device, the first information comprising a three-dimensional (3D) specification of physical dimensions for the vehicle having the ADAS;

scanning, by the mobile device, the vehicle and a physical target for the ADAS, the scanning performed with the camera and the LiDAR device after receiving the first information, the scanning generating frame data;

tracking, by the mobile device, the vehicle in the frame data using the first information;

generating, by the mobile device, an output indicating whether the physical target is positioned at a target location for the ADAS; and initiating, after the output is generated, a calibration process of the ADAS that uses the physical target.

2. The method of claim 1, wherein generating the output comprises presenting a camera feed on a display of the mobile device, and adding a virtual target in the camera feed, the virtual target positioned according to a calibration specification for the ADAS.

3. The method of claim 2, wherein multiple virtual targets are specified by the calibration specification, the method further comprising selecting the virtual target from among the multiple virtual targets for adding the virtual target to the camera feed.

4. The method of claim 2, further comprising rendering a virtual overlay on the vehicle in the camera feed, the virtual overlay positioned based on tracking the vehicle in the frame data.

5. The method of claim 2, further comprising:

receiving, by the mobile device, second information comprising a 3D specification for the physical target; and tracking, by the mobile device, also the physical target in the frame data, the physical target tracked using the second information, wherein the output indicates whether the physical target is positioned at the target location for the ADAS based on the tracking of the physical target.

6. The method of claim 5, further comprising:

performing a determination, by the mobile device and based on the tracking of the physical target, that a position of the physical target substantially coincides with the target location for the ADAS, wherein the output is generated based on the determination.

7. The method of claim 2, wherein the mobile device is a handheld device or a wearable device.

8. The method of claim 7, wherein the method is a one-person process performed on the mobile device, and wherein a person carries the mobile device and observes, on the display, (i) the camera feed including the physical target and (ii) the virtual target while maneuvering the physical target.

9. The method of claim 1, wherein the first information includes a computer aided design model of the vehicle.

10. The method of claim 5, wherein the second information includes a computer aided design model of the physical target.

11. The method of claim 5, wherein performing the tracking of the physical target comprises tracking a three-by-three pattern of alternating dark and light areas having a same size included in the physical target.

12. The method of claim 5, wherein performing the tracking of the vehicle and the tracking of the physical target comprises performing sequential tracking.

13. The method of claim 5, wherein performing the sequential tracking comprises running another thread in an object tracker.

14. The method of claim 1, wherein performing the scanning comprises generating camera frame data using the camera and generating a depth map using the LiDAR, the method further comprising performing a conversion using the camera frame data and the depth map to generate the frame data.

15. The method of claim 14, wherein performing the conversion comprises performing at least one of a pixel format conversion or a flattening.

16. The method of claim 15, wherein performing the conversion comprises combining color data of the camera frame data with the depth data.

17. The method of claim 1, wherein receiving the first information comprises obtaining the first information from a trained object database.

18. The method of claim 1, wherein performing the tracking of the vehicle in the frame data comprises using an object recognition library.

19. The method of claim 1, wherein performing the tracking of the vehicle in the frame data comprises comparing the frame data with an object definition in the first information.

* * * * *